(12) United States Patent
Aiba et al.

(10) Patent No.: US 11,147,101 B2
(45) Date of Patent: Oct. 12, 2021

(54) USER EQUIPMENTS, BASE STATIONS AND METHODS

(71) Applicants: Sharp Laboratories of America, Inc., Camas, WA (US); FG Innovation Company Limited, Tuen Mun (HK)

(72) Inventors: Tatsushi Aiba, Vancouver, WA (US); Zhanping Yin, Vancouver, WA (US)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 19 days.

(21) Appl. No.: 16/244,520

(22) Filed: Jan. 10, 2019

(65) Prior Publication Data

US 2019/0215871 A1 Jul. 11, 2019

Related U.S. Application Data

(63) Continuation of application No. PCT/US2019/012885, filed on Jan. 9, 2019.
(Continued)

(51) Int. Cl.
*H04W 74/08* (2009.01)
*H04W 48/16* (2009.01)
(Continued)

(52) U.S. Cl.
CPC ....... *H04W 74/0833* (2013.01); *H04L 5/0094* (2013.01); *H04L 27/2666* (2013.01);
(Continued)

(58) Field of Classification Search
CPC ............... H04W 72/14; H04W 72/042; H04W 74/0833; H04W 76/27; H04W 48/16; H04L 27/2666; H04L 5/0094
See application file for complete search history.

(56) References Cited

U.S. PATENT DOCUMENTS

2010/0128614 A1   5/2010   Kuusela et al.
2011/0305211 A1   12/2011  Lunttila et al.
(Continued)

FOREIGN PATENT DOCUMENTS

JP   2016171597 A   9/2016

OTHER PUBLICATIONS

3GPP TS 38.211 V2.0.0, 3rd Generation Partnership Project; Technical Specification Group Radio Access Network; NR; Physical channels and modulation (Release 15), Dec. 2017.
(Continued)

*Primary Examiner* — Melanie Jagannathan
(74) *Attorney, Agent, or Firm* — ScienBiziP, P.C.

(57) ABSTRACT

A user equipment (UE) is described. Receiving circuitry is configured to receive a radio resource control (RRC) message including first information used for indicating an index of a downlink bandwidth part (DL BWP) in a primary cell. Transmitting circuitry is configured to perform, based on an initiation of a random access procedure, the random access procedure. In a case that physical random access channel (PRACH) resources are not configured for an active UL BWP in the primary cell, the random access procedure is performed on a DL BWP in the primary cell and an UL BWP in the primary cell. An index of the DL BWP being defined as "0", and an index of the UL BWP being defined as "0".

12 Claims, 14 Drawing Sheets

Related U.S. Application Data

(60) Provisional application No. 62/616,233, filed on Jan. 11, 2018.

(51) Int. Cl.
  *H04W 76/27* (2018.01)
  *H04L 27/26* (2006.01)
  *H04L 5/00* (2006.01)
  *H04W 72/04* (2009.01)
  *H04W 48/12* (2009.01)

(52) U.S. Cl.
  CPC ........... *H04W 48/16* (2013.01); *H04W 76/27* (2018.02); *H04W 48/12* (2013.01); *H04W 72/0406* (2013.01); *H04W 72/0453* (2013.01)

(56) References Cited

U.S. PATENT DOCUMENTS

| | | | |
|---|---|---|---|
| 2017/0325258 A1 | 11/2017 | Nogami et al. | |
| 2019/0104554 A1* | 4/2019 | Amuru | H04W 72/042 |
| 2019/0132110 A1* | 5/2019 | Zhou | H04L 5/0098 |
| 2019/0141742 A1* | 5/2019 | Zhou | H04B 7/02 |
| 2019/0182870 A1* | 6/2019 | Shih | H04W 74/004 |
| 2019/0191464 A1* | 6/2019 | Loehr | H04W 72/14 |
| 2019/0274172 A1* | 9/2019 | Yoon | H04W 74/0866 |
| 2020/0128588 A1* | 4/2020 | Xiong | H04W 72/042 |
| 2020/0266959 A1* | 8/2020 | Yi | H04W 74/0833 |
| 2020/0344761 A1* | 10/2020 | Amuru | H04B 7/0452 |
| 2020/0351729 A1* | 11/2020 | Rastegardoost | H04W 36/0072 |

OTHER PUBLICATIONS

3GPP TS 38.212. V2.0.0, 3rd Generation Partnership Project; Technical Specification Group Radio Access Network NR; Multiplexing and channel coding (Release 15), Dec. 2017.

3GPP TS 38.213 V2.0.0, 3rd Generation Partnership Project; Technical Specification Group Radio Access Network NR; Physical layer procedures for control (Release 15), Dec. 2017.

3GPP TS 38.214 V2.0.0, 3rd Generation Partnership Project; Technical Specification Group Radio Access Network NR; Physical layer procedures for data (Release 15), Dec. 2017.

MediaTek Inc., "Summary of Offline Discussion on Bandwidth Part Operation", 3GPP TSG RAN WG1 Meeting 90bis, Prague, CZ, R1-17xxxxx, Oct. 13, 2017.

International Search Report and Written Opinion issued for PCT Application No. PCT/US2018/012885 dated Mar. 18, 2019.

* cited by examiner

Docket No.: SLA3771.1

2/14

Supported Transmission Numerologies

| $\mu$ | $\Delta f = 2^{\mu} \cdot 15 [kHz]$ | Cyclic [ |
|---|---|---|
| 0 | 15 | Norn |
| 1 | 30 | Norn |
| 2 | 60 | Normal, E |
| 3 | 120 | Norn |
| 4 | 240 | Norn |

Number of OFDM Symbols Per Slot

| | | Slot configuration | | | |
|---|---|---|---|---|---|
| | | 0 | | 1 | |
| $\mu$ | $N_{symb}^{slot}$ | $N_{slot}^{frame,\mu}$ | $N_{slot}^{subframe,\mu}$ | $N_{symb}^{slot}$ | $N_{slot}^{frame,\mu}$ |
| 0 | 14 | 10 | 1 | | |
| 1 | 14 | 20 | 2 | 7 | 20 |
| 2 | 14 | 40 | 4 | 7 | 40 |
| 3 | 14 | 80 | 8 | 7 | 80 |
| 4 | 14 | 160 | 16 | - | - |

FIG. 2

USER EQUIPMENTS, BASE STATIONS AND METHODS

RELATED APPLICATIONS

This application is related to and claims priority from U.S. Provisional Patent Application No. 62/616,233, entitled "USER EQUIPMENTS, BASE STATIONS AND METHODS," filed on Jan. 11, 2018, which is hereby incorporated by reference herein, in its entirety.

TECHNICAL FIELD

The present disclosure relates generally to communication systems. More specifically, the present disclosure relates to new signaling, procedures, user equipment (UE) and base stations for user equipments, base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 2 shows examples of multiple numerologies;

DETAILED DESCRIPTION

Figure 1:
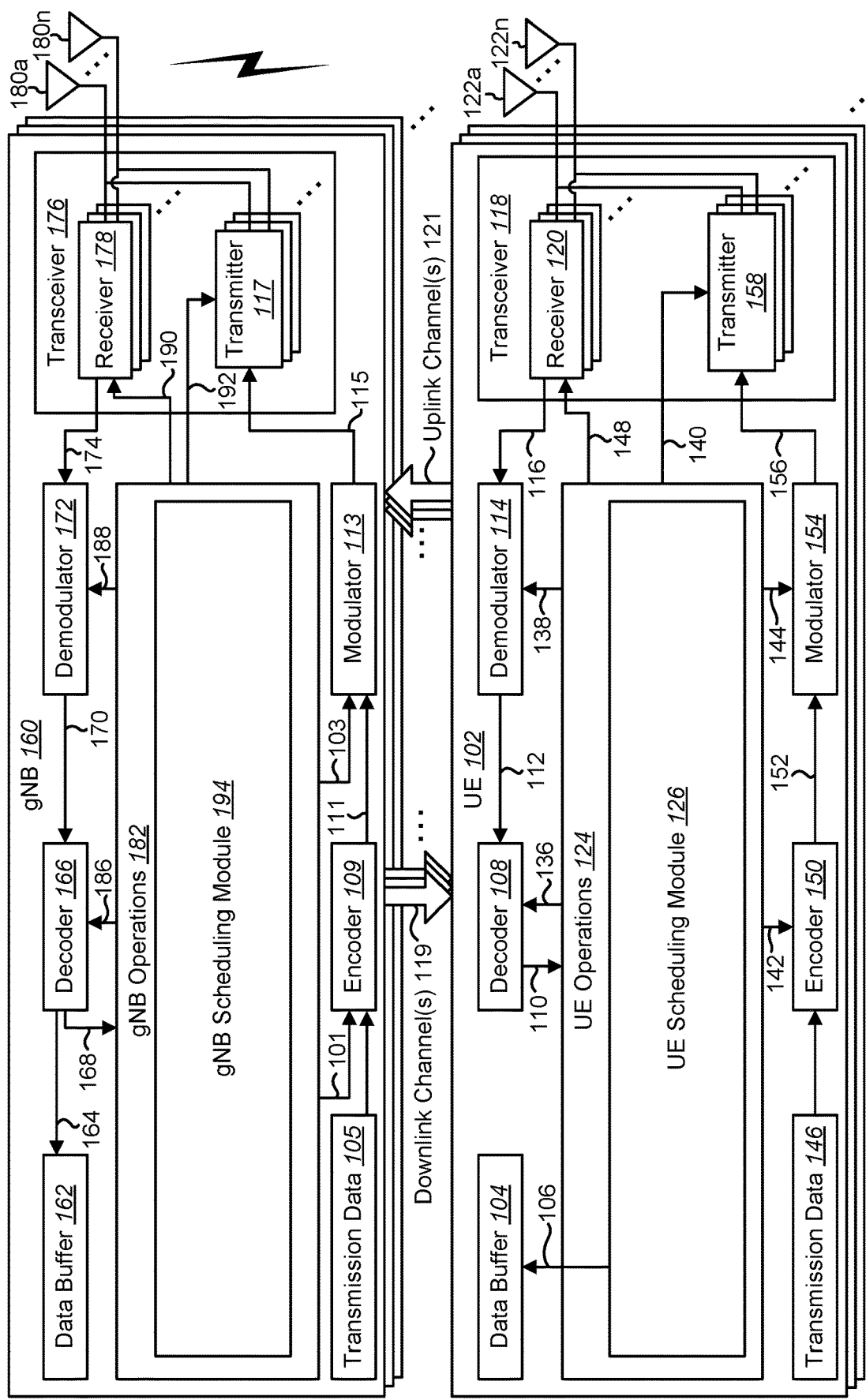
FIG. 1 is a block diagram illustrating one implementation of one or more base stations (gNBs) and one or more user equipments (UEs) in which systems and methods for downlink and/or uplink (re)transmissions may be implemented.

A user equipment (UE) is described. The UE includes receiving circuitry configured to receive a radio resource control (RRC) message including first information used for indicating an index of a downlink bandwidth part (DL BWP) in a primary cell. The receiving circuitry is configured to receive a RRC message comprising second information used for indicating an index of an uplink bandwidth part (UL BWP) in the primary cell. The UE also includes transmitting circuitry configured to perform, based on an initiation of a random access procedure, the random access procedure. In a case that physical random access channel (PRACH) resources are not configured for an active UL BWP in the primary cell, the random access procedure is performed on a DL BWP in the primary cell and an UL BWP in the primary cell. An index of the DL BWP may be defined as "0", and an index of the UL BWP may be defined as "0." In a case that PRACH resources are configured for an active UL BWP in the primary cell, the random access procedure is performed on a DL BWP in the primary cell and the active UL BWP in the primary cell, the DL BWP being linked with the active UL BWP based on the index of the DL BWP indicated by using the first information and the index of the UL BWP indicated by using the second information.

The receiving circuitry may further be configured to receive system information comprising third information used for indicating a bandwidth of the DL BWP with the index "0" and a subcarrier spacing of the DL BWP with the index "0." The receiving circuitry may also be configured to receive system information comprising fourth information used for indicating a bandwidth of the UL BWP with the index "0" and a subcarrier spacing of the UL BWP with the index "0".

The DL BWP with the index "0" may be activated and the UL BWP with the index "0" may be activated.

A base station apparatus is described. The base station includes transmitting circuitry configured to transmit a radio resource control (RRC) message including first information used for indicating an index of a downlink bandwidth part (DL BWP) in a primary cell. The transmitting circuitry is configured to transmit a RRC message comprising second information used for indicating an index of an uplink bandwidth part (UL BWP) in the primary cell. The base station also includes receiving circuitry configured to perform the random access procedure. In a case that physical random access channel (PRACH) resources are not configured for an active UL BWP in the primary cell, the random access procedure is performed on a DL BWP in the primary cell and an UL BWP in the primary cell. An index of the DL BWP may be defined as "0", and an index of the UL BWP may be defined as "0." In a case that PRACH resources are configured for an active UL BWP in the primary cell, the random access procedure is performed on a DL BWP in the primary cell and the active UL BWP in the primary cell, the DL BWP being linked with the active UL BWP based on the index of the DL BWP indicated by using the first information and the index of the UL BWP indicated by using the second information.

The transmitting circuitry may further be configured to transmit system information comprising third information used for indicating a bandwidth of the DL BWP with the index "0" and a subcarrier spacing of the DL BWP with the index "0." The transmitting circuitry may further be configured to transmit system information comprising fourth information used for indicating a bandwidth of the UL BWP with the index "0" and a subcarrier spacing of the UL BWP with the index "0".

The DL BWP with the index "0" may be activated, and the UL BWP with the index "0" may be activated.

A communication method of a user equipment is described. The communication method includes receiving a radio resource control (RRC) message including first information used for indicating an index of a downlink bandwidth part (DL BWP) in a primary cell. The communication method also includes receiving a RRC message comprising second information used for indicating an index of an uplink bandwidth part (UL BWP) in the primary cell. The communication method also includes performing, based on an initiation of a random access procedure, the random access procedure. In a case that physical random access channel (PRACH) resources are not configured for an active UL BWP in the primary cell, the random access procedure is performed on a DL BWP in the primary cell and an UL BWP in the primary cell, an index of the DL BWP being defined as "0", an index of the UL BWP being defined as "0". In a case that PRACH resources are configured for an active UL BWP in the primary cell, the random access procedure is performed on a DL BWP in the primary cell and the active UL BWP in the primary cell, the DL BWP being linked with the active UL BWP based on the index of the DL BWP indicated by using the first information and the index of the UL BWP indicated by using the second information.

The communication method may further include receiving system information comprising third information used for indicating a bandwidth of the DL BWP with the index "0" and a subcarrier spacing of the DL BWP with the index "0". The communication method may also further include receiving system information comprising fourth information used for indicating a bandwidth of the UL BWP with the index "0" and a subcarrier spacing of the UL BWP with the index "0".

The DL BWP with the index "0" may be activated, and the UL BWP with the index "0" may be activated.

A communication method of a base station apparatus is described. The communication method includes transmitting a radio resource control (RRC) message including first information used for indicating an index of a downlink bandwidth part (DL BWP) in a primary cell. The communication method also includes transmitting a RRC message comprising second information used for indicating an index of an uplink bandwidth part (UL BWP) in the primary cell. The communication method also includes performing the random access procedure. In a case that physical random access channel (PRACH) resources are not configured for an active UL BWP in the primary cell, the random access procedure is performed on a DL BWP in the primary cell and an UL BWP in the primary cell, an index of the DL BWP being defined as "0", an index of the UL BWP being defined as "0". In a case that PRACH resources are configured for an active UL BWP in the primary cell, the random access procedure is performed on a DL BWP in the primary cell and the active UL BWP in the primary cell, the DL BWP being linked with the active UL BWP based on the index of the DL BWP indicated by using the first information and the indicated index of the UL BWP indicated by using the second information.

The communication method of a base station apparatus may further include transmitting system information comprising third information used for indicating a bandwidth of the DL BWP with the index "0" and a subcarrier spacing of the DL BWP with the index "0". The communication method of a base station apparatus may also include transmitting system information comprising fourth information used for indicating a bandwidth of the UL BWP with the index "0" and a subcarrier spacing of the UL BWP with the index "0".

The DL BWP with the index "0" may be activated, and the UL BWP with the index "0" may be activated.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra Reliable and Low Latency Communication) transmission, and eMTC (massive Machine Type Communication) transmission. Also, in NR, one or more bandwidth parts (BWPs) may be specified (e.g., configured) for a serving cell. A user equipment (UE) may receive a downlink signal(s) in the BWP(s) of the serving cell. Also, the UE may transmit an uplink signal(s) in the BWP(s) of the serving cell.

In order for the services to use the time, frequency, and/or space resources efficiently, it would be useful to be able to efficiently control downlink and/or uplink transmissions. Therefore, a procedure for efficient control of downlink and/or uplink transmissions should be designed. However, the detailed design of a procedure for downlink and/or uplink transmissions has not been studied yet.

In some approaches, a user equipment (UE) may receive a radio resource control (RRC) message including first information used for configuring more than one indices of downlink bandwidth parts (DL BWPs), wherein the more than one indices of the DL BWPs being used for indicating that which BWPs are scheduled by using a DCI format for the downlink. Also, the UE may receive on a physical downlink control channel (PDCCH), the DCI format for downlink including second information. And, the UE may perform, based on the first information and a value of the second information, reception on the PDSCH in one DL BWP.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for downlink and/or uplink (re)transmissions may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n. In some implementations, the term "base station," "eNB," and/or "gNB" may refer to and/or may be replaced by the term "Transmission Reception Point (TRP)." For example, the gNB 160 described in connection with FIG. 1 may be a TRP in some implementations.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (Physical Uplink Shared Channel)) and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 physical shared channel (e.g., PDSCH (Physical Downlink Shared Channel) and/or a physical control channel (PDCCH (Physical Downlink Control Channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE scheduling module 126.

The UE scheduling module 126 may perform downlink reception(s) and uplink transmission(s). The downlink reception(s) include reception of data, reception of downlink control information, and/or reception of downlink reference signals. Also, the uplink transmissions include transmission of data, transmission of uplink control information, and/or transmission of uplink reference signals.

In a radio communication system, physical channels (uplink physical channels and/or downlink physical channels) may be defined. The physical channels (uplink physical channels and/or downlink physical channels) may be used for transmitting information that is delivered from a higher layer.

For example, in uplink, a PRACH (Physical Random Access Channel) may be defined. For instance, the PRACH may be used for a random access preamble (e.g., a message 1 (Msg.1)). In some approaches, the PRACH may be used for an initial access connection establishment procedure, a handover procedure, a connection re-establishment, a timing adjustment (e.g., a synchronization for an uplink transmission) and/or for requesting an uplink shared channel (UL-SCH) resource (e.g., the uplink PSCH (e.g., PUSCH) resource).

In another example, a PCCH (Physical Control Channel) may be defined. The PCCH may be used to transmit control information. In uplink, PCCH (e.g., Physical Uplink Control Channel (PUCCH)) is used for transmitting Uplink Control Information (UCI). The UCI may include Hybrid Automatic Repeat Request (HARQ-ACK), channel state information (CSI) and/or a scheduling request (SR). The HARQ-ACK is used for indicating a positive acknowledgement (ACK) or a negative acknowledgment (NACK) for downlink data (e.g., Transport block(s), Medium Access Control Protocol Data Unit (MAC PDU) and/or Downlink Shared Channel (DL-SCH)). The CSI is used for indicating state of downlink channel (e.g., a downlink signal(s)). Here, the CSI reporting may be periodic and/or aperiodic. Also, the SR is used for requesting resources of uplink data (e.g., Transport block(s), MAC PDU and/or Uplink Shared Channel (UL-SCH)).

Here, the DL-SCH and/or the UL-SCH may be a transport channel that is used in the MAC layer. Also, a transport block(s) (TB(s)) and/or a MAC PDU may be defined as a unit(s) of the transport channel used in the MAC layer. For example, control, management, and/or process of HARQ may be performed, in the MAC layer, per the transport block. The transport block may be defined as a unit of data delivered from the MAC layer to the physical layer. The MAC layer may deliver the transport block to the physical layer (i.e., the MAC layer delivers the data as the transport block to the physical layer). In the physical layer, the transport block may be mapped to one or more codewords.

In downlink, the PCCH (e.g., Physical Downlink Control Channel (PDCCH)) may be used for transmitting downlink control information (DCI). Here, more than one DCI format may be defined (e.g., configured) for DCI transmission on the PCCH. Namely, fields may be defined in the DCI format, and the fields are mapped to the information bits (e.g., DCI bits).

For example, a DCI format 1, a DCI format 1A, a DCI format 2, and/or a DCI format 2A that are used for scheduling of downlink physical shared channel(s) in a cell may be defined as the DCI format for the downlink. Here, the DCI format 1, the DCI format 1A, the DCI format 2, and/or the DCI format 2A described herein may be assumed to be included in a DCI format A in some implementations for the sake of simplifying description. Also, a DCI format X and/or a DCI format Y that are used for scheduling of downlink physical channel(s) in a cell may be defined as the DCI format (e.g., a fallback DCI format) for the downlink. Here, the DCI format X and/or the DCI format Y described herein may be assumed to be included in a DCI format B in some implementations for the sake of simplifying descriptions. Also, DCI format Z and/or a DCI format K that are used for activating, deactivating, and/or switching a serving cell(s) (e.g., one or more secondary cell(s), one or more downlink secondary cells, and/or one or more secondary downlink component carriers) and/or a bandwidth part(s) (e.g., one or more DL BWP(s)) may be defined as the DCI format for the downlink. Here, the DCI format Z and/or the DCI format K described herein may be assumed to be included in a DCI format C in some implementations for the sake of simplifying descriptions.

Also, a DCI format 0, and/or a DCI format 4 that are used for scheduling of uplink physical shared channel(s) in a cell may be defined as the DCI format for the uplink. Here, the DCI format 0, and/or the DCI format 4 described herein may be assumed to be included in a DCI format D in some implementations for the sake of simplifying description. Also, a DCI format L and/or a DCI format M that are used for scheduling of uplink physical channel(s) in a cell may be defined as the DCI format (e.g., a fallback DCI format) for the uplink. Here, the DCI format L and/or the DCI format M described herein may be assumed to be included in a DCI format E in some implementations for the sake of simplifying descriptions. Also, a DCI format 0 and/or a DCI format P that are used for activating, deactivating, and/or switching a serving cell(s) (e.g., one or more secondary cell(s), one or more uplink secondary cells, and/or one or more secondary uplink component carriers) and/or a bandwidth part(s) (e.g., one or more UL BWP(s)) may be defined as the DCI format for the uplink. Here, the DCI format 0 and/or the DCI format P described herein may be assumed to be included in a DCI format F in some implementations for the sake of simplifying descriptions.

Here, as described above, a RNTI(s) assigned (e.g., by the gNB 160) to the UE 102 may be used for transmission of DCI (e.g., the DCI format(s), DL control channel(s) (e.g., the PDCCH(s)). Namely, CRC (Cyclic Redundancy Check) parity bits (also referred to simply as CRC), which are generated based on DCI, are attached to DCI, and, after attachment, the CRC parity bits are scrambled by the RNTI(s). The UE 102 may attempt to decode (e.g., blind decoding, monitor, detect) DCI to which the CRC parity bits scrambled by the RNTI(s) are attached. Namely, the UE 102 detects DL control channel (e.g., the PDCCH, the DCI, the DCI format(s)) based on the blind decoding. That is, the UE 102 may decode the DL control channel(s) with the CRC scrambled by the RNTI(s). In other words, the UE 102 may monitor the DL control channel(s) with the RNTI(s). Also, as described below, the UE 102 may detect the DCI format(s) in a USS (i.e., the CORESET of a USS (i.e., a UE-specific search space)) and/or a CSS (i.e., the CORESET of a CSS (i.e., a common search space, a UE-common search space)). Namely, the UE 102 may detect the DCI format(s) with the RNTI(s).

Here, the RNTI(s) may include C-RNTI (Cell-RNTI, a first C-RNTI), SPS C-RNTI (Semi-Persistent Scheduling C-RNTI, a second C-RNTI), CS-RNTI (Configured Scheduling C-RNTI), C-RNTI for the fallback DCI format(s) (e.g., a third C-RNTI for the DCI format B and/or the DCI format E), C-RNTI for the activating/deactivating/switching DCI format(s) (a fourth C-RNTI for the DCI format C and/or the DCI format F), SI-RNTI (System Information RNTI), P-RNTI (Paging RNTI), RA-RNTI (Random Access-RNTI), and/or Temporary C-RNTI.

For example, the C-RNTI may be a unique identification used for identifying a RRC connection and/or scheduling.

Also, the SPS C-RNTI may be a unique identification used for semi-persistent scheduling. Also, the CS-RNTI may be a unique identification used for scheduling of transmission based on a configured grant. Also, the C-RNTI for the fallback DCI format(s) may be a unique identification used for scheduling by the fallback DCI format(s). Also, the C-RNTI for the activating/deactivating/switching DCI format(s) may be a unique identification used for scheduling by the DCI format(s) used for the activating/deactivating/switching of the serving cell(s) and/or the BWP(s) (e.g., the DL BWP(s) and/or the UL BWP(s)). Also, the SI-RNTI may be used for identifying SI (i.e., SI message) mapped on the BCCH and dynamically carried on DL-SCH. Also, the SI-RNTI may be used for broadcasting of SI. Also, the P-RNTI may be used for transmission of paging and/or SI change notification. Also, the RA-RNTI may be an identification used for the random access procedure. Also, the Temporary C-RNTI may be used for the random access procedure.

Also, for example, PSCH may be defined. For example, in a case that the downlink PSCH resource (e.g., the PDSCH, the PDSCH resource) is scheduled by using the DCI format(s), the UE 102 may receive the downlink data, on the scheduled downlink PSCH resource (e.g., the PDSCH, the PDSCH resource). Also, in a case that the uplink PSCH resource (e.g., the PUSCH, the PUSCH resource) is scheduled by using the DCI format(s), the UE 102 transmits the uplink data, on the scheduled uplink PSCH resource (e.g., the PUSCH, the PUSCH resource). Namely, the downlink PSCH may be used to transmit the downlink data (i.e., DL-SCH, a downlink transport block(s)). And, the uplink PSCH may be used to transmit the uplink data (i.e., UL-SCH, an uplink transport block(s)).

Furthermore, the downlink PSCH (e.g., the PDSCH) and/or the uplink PSCH (e.g., the PUSCH) may be used to transmit information of a higher layer (e.g., a radio resource control (RRC)) layer, and/or a MAC layer). For example, the downlink PSCH (i.e., from the gNB 160 to the UE 102) and/or the uplink PSCH (i.e., from the UE 102 to the gNB 160) may be used to transmit a RRC message (a RRC signal). Also, the downlink PSCH (i.e., from the gNB 160 to the UE 102) and/or the uplink PSCH (i.e., from the UE 102 to the gNB 160) may be used to transmit a MAC control element (a MAC CE). Here, the RRC message that is transmitted from the gNB 160 in downlink may be common to multiple UEs 102 (and/or multiple serving cells) within a cell (referred as a common RRC message). Also, the RRC message that is transmitted from the gNB 160 may be dedicated to a certain UE 102 (and/or a serving cell (i.e., a serving cell-dedicated)) (referred as a dedicated RRC message). The RRC message and/or the MAC CE are also referred to as a higher layer signal.

In some approaches, the downlink PSCH (e.g., the PDSCH) may be used for transmitting (e.g., notifying, specifying, identifying, etc.) a random access response. For example, the downlink PSCH (e.g., the PDSCH) may be scheduled by using the downlink PCH (e.g., the PDCCH) with RA-RNTI (random access RNTI (radio network temporary identifier)). For instance, the random access response grant may be used for scheduling of the uplink PSCH (e.g., the PUSCH, a Message 3 in a random access procedure (e.g., a contention based random access procedure)). The random access response grant may be delivered from the higher layer (e.g., the MAC layer) to the physical layer.

In some approaches, a PBCH (physical broadcast channel, (e.g., primary PBCH)) may be defined. For example, the PBCH may be used for broadcasting the MIB (master information block). For instance, the MIB may be used by multiple UEs 102 and may include system information transmitted on the BCH (broadcast channel). Also, the MIB may include information (e.g., an information block) for configuring a secondary PBCH. Furthermore, the MIB may include information (e.g., an information block) for configuring the downlink PSCH (e.g., PDSCH). For example, the PBCH (e.g., MIB) may be used for carrying, at least, information indicating a SFN (system frame number).

Here, the system information may be divided into the MIB and a number of SIB(s) (system information block(s)). The MIB may include a limited number of most essential and/or most frequently transmitted information (e.g., parameter(s)) that are needed to acquire other information from the cell. Namely, the PBCH (e.g., MIB) may include minimum system information. Also, the SIB(s) may be carried in a system information message. For example, the SIB(s) may be transmitted on the secondary PBCH and/or the downlink PSCH (e.g., the PDSCH). The SIB(s) (e.g., System Information Block Type 2) may include remaining minimum system information (i.e., RMSI). For example, the SIB(s) (e.g., System Information Block Type 2) may contain radio resource configuration information that is common for multiple UEs 102.

In some approaches, the SIB(s) may contain information for a random access channel configuration (e.g., a random access configuration for a preamble format) that is used for a random access procedure (e.g., a random access preamble transmission (Msg.1 transmission)). For example, the information for the random access configuration may include the preamble format, the SFN, a subframe number (e.g., a subframe number, a slot number and/or a symbol number). Also, a part of the information for the random access configuration may be included in the MIB (e.g., PBCH).

In some approaches, in downlink, a SS (Synchronization Signal) may be defined. The SS may be used for synchronizing downlink time-frequency (a time domain and/or a frequency domain). The SS may include a PSS (Primary Synchronization Signal). Additionally or alternatively, the SS may include a SSS (Secondary Synchronization Signal). For example, the PSS, the SSS, and/or the PBCH may be used for identifying a physical layer cell identity.

In the radio communication for uplink, UL RS(s) may be used as uplink physical signal(s). The uplink physical signal may not be used to transmit information that is provided from the higher layer, but is used by a physical layer. For example, the UL RS(s) may include the demodulation reference signal(s), the UE-specific reference signal(s), the sounding reference signal(s) (the SRS(s)) and/or the beam-specific reference signal(s). The demodulation reference signal(s) may include the demodulation reference signal(s) associated with transmission of the uplink physical channel (e.g., the PUSCH and/or the PUCCH).

Also, in the radio communication for downlink, DL RS(s) may be used as downlink physical signal(s). The downlink physical signal may not be used to transmit information that is provided from the higher layer, but is used by a physical layer. For example, the DL RS(s) may include the cell-specific reference signal(s), the UE-specific reference signal(s), the demodulation reference signal(s), and/or the channel state information reference signal(s) (the CSI-RS(s)). The UE-specific reference signal may include the UE-specific reference signal(s) associated with transmission of the downlink physical channel (e.g., the PDSCH and/or the PDCCH). Also, the demodulation reference signal(s) may include the demodulation reference signal(s) associated with transmission of the downlink physical channel (e.g., the PDSCH and/or the PDCCH). Also, the CSI-RS may include Non-zero power Channel State Information-Reference signal(s) (NZP CSI-RS), and/or Zero power Channel State Information-Reference signal (ZP CSI-RS).

Here, the downlink physical channel(s) and/or the downlink physical signal(s) described herein may be assumed to be included in a downlink signal (i.e., a DL signal(s)) in some implementations for the sake of simple descriptions. Also, the uplink physical channel(s) and/or the uplink physical signal(s) described herein may be assumed to be included in an uplink signal (i.e. an UL signal(s)) in some implementations for the sake of simple descriptions.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may perform scheduling of downlink and/or uplink transmissions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module

182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 shows examples of multiple numerologies. As shown in FIG. 2, multiple numerologies (i.e., multiple subcarrier spacing) may be supported. For example, $\mu$ (e.g., a subcarrier space configuration) and a cyclic prefix (e.g., the $\mu$ and the cyclic prefix for a carrier bandwidth part) may be configured by higher layer parameters (i.e., a RRC message) for the downlink and/or the uplink. Here, 15 kHz may be a reference numerology. For example, an RE of the reference numerology may be defined with a subcarrier spacing of 15 kHz in a frequency domain and 2048 Ts+CP length (e.g. 160 Ts or 144 Ts) in a time domain, where Ts denotes a baseband sampling time unit defined as 1/(15000*2048) seconds.

Also, a number of OFDM symbol(s) per slot ($N_{symb}^{slot}$) may be determined based on the $\mu$ (e.g., the subcarrier space configuration). Here, for example, a slot configuration 0 (i.e., the number of OFDM symbols per slot may be 14) and/or a slot configuration (i.e., the number of OFDM symbols per slot may be 7) may be defined.

Figure 3:
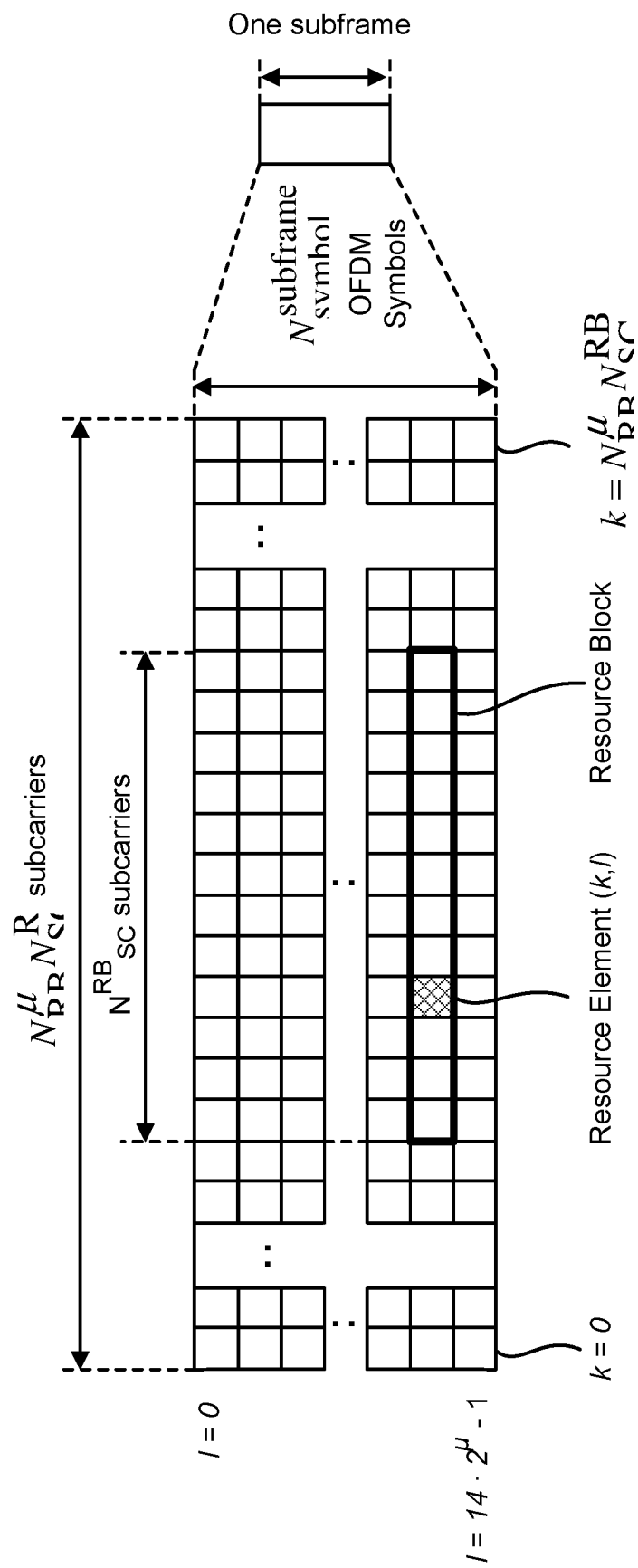
FIG. 3 is a diagram illustrating one example of a resource grid and resource block for the downlink and/or the uplink.

FIG. 3 is a diagram illustrating one example of a resource grid and resource block (e.g., for the downlink and/or the uplink). The resource grid illustrated in FIG. 3 may be utilized in some implementations of the systems and methods disclosed herein.

In FIG. 3, one subframe may include $N_{symbol}^{subframe,\mu}$ symbol symbols. Also, a resource block may include a number of resource elements (RE). Here, in the downlink, the OFDM access scheme with cyclic prefix (CP) may be employed, which may be also referred to as CP-OFDM. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair may include two downlink RBs that are continuous in the time domain. And, the downlink RB may include twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l), where k and l are indices in the frequency and time domains, respectively.

Also, in the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). An uplink radio frame may include multiple pairs of uplink resource blocks. The uplink RB pair is a unit for assigning uplink radio resources, defined by a predetermined bandwidth (RB bandwidth) and a time slot. The uplink RB pair may include two uplink RBs that are continuous in the time domain. The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a resource element (RE) and is uniquely identified by the index pair (k,l) in a slot, where k and l are indices in the frequency and time domains respectively.

Each element in the resource grid (e.g., antenna port p) and the subcarrier configuration $\mu$ is called a resource element and is uniquely identified by the index pair (k,l) where k=0, . . . , $N_{RB}^{\mu} N_{SC}^{RB}-1$ the in the frequency domain and l refers to the symbol position in the time domain. The resource element (k,l) on the antenna port p and the sub-carrier spacing configuration $\mu$ is denoted (k,l)p,$\mu$. The physical resource block is defined as $N_{SC}^{RB}=12$ consecutive subcarriers in the frequency domain. The physical resource blocks are numbered from 0 to $N_{RB}^{\mu}-1$ in the frequency domain. The relation between the physical resource block number $n_{PRB}$ in the frequency domain and the resource element (k,l) is given by $$n_{PRB} = \left\lfloor \frac{k}{N_{SC}^{RB}} \right\rfloor.$$

Figure 4:
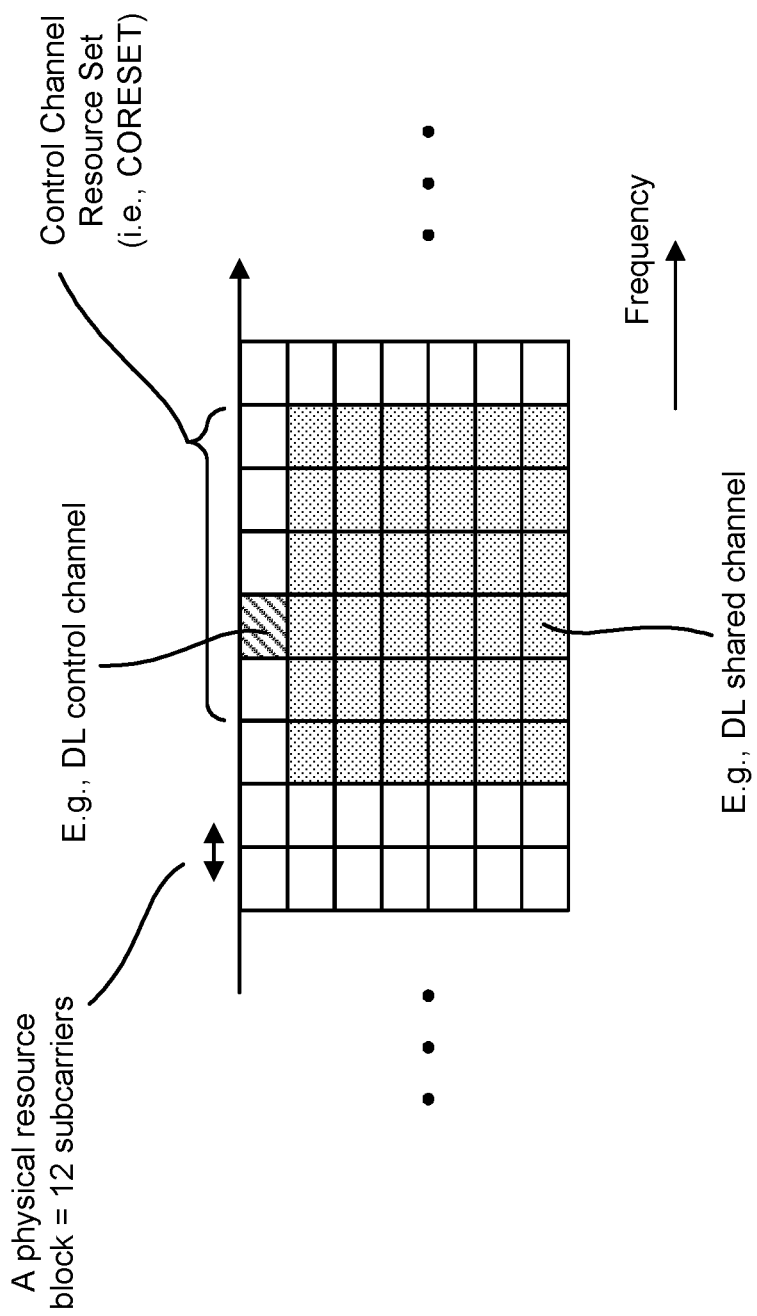
FIG. 4 shows examples of resource regions.

FIG. 4 shows examples of resource regions (e.g., resource region of the downlink). One or more sets of PRB(s) (e.g., a control resource set (e.g., CORESET)) may be configured for DL control channel monitoring (e.g., the PDCCH monitoring). For example, the control resource set (e.g., the CORESET) is, in the frequency domain and/or the time domain, a set of PRBs within which the UE 102 attempts to decode the DCI (e.g., the DCI format(s), the PDCCH(s)), where the PRBs may or may not be frequency contiguous and/or time contiguous, a UE 102 may be configured with one or more control resource sets (i.e., the CORESETs) and one DCI message may be mapped within one control resource set. In the frequency-domain, a PRB is the resource unit size (which may or may not include DM-RS) for the DL control channel.

The UE 102 may monitor a set of candidates of the DL control channel(s) in the control resource set (e.g., the CORESET). Here, the candidates of DL control channel (s) may be candidates for which the DL control channel(s) may possibly be mapped, assigned, and/or transmitted. For example, a candidate of the DL control channel(s) is composed of one or more control channel elements (CCEs). Here, the term "monitor" means that the UE 102 attempts to decode each DL control channel(s) in the set of candidates of the DL control channel(s) in accordance with all the DCI format(s) to be monitored.

The set of candidates of the DL control channel(s) (e.g., the PDCCH(s), the PDCCH candidates, the CORESET) for the UE 102 monitors may be also referred to as a search space(s). That is, the search space(s) is a set of resource (e.g., CORESET) that may possibly be used for transmission of the DL control channel(s). The UE 102 may monitor the set of candidates of the DL control channel(s) according to the search space(s) where monitoring implies attempting to detect each DL control channel(s) candidate according to the monitored DCI formats.

Here, the common search space (the CSS, the UE-common search space) and/or the user-equipment search space (the USS, the UE-specific search space) are defined (or set, configured) in a region(s) of DL control channel(s) (e.g., the DL control channel monitoring regions, CORESET). For example, the CSS may be used for transmission of DCI to a plurality of the UEs 102. That is, the CSS may be defined by a resource common to a plurality of the UEs 102. For example, a Type0-PDCCH common search space may be defined for the DCI format(s) with CRC scrambled by the SI-RNTI. Also, a Type1-PDCCH common search space may be defined for the DCI format(s) with CRC scrambled by the RA-RNTI, the Temporary C-RNTI, and/or the C-RNTI. Also, a Type2-PDCCH common search space may be defined for the DCI format(s) with CRC scrambled by the P-RNTI. Also, a Type3-PDCCH common search space may be defined for the DCI format(s) with CRC scrambled by the C-RNTI and/or the CS-RNTI. Here, the gNB 160 may configure, by using the PBCH (e.g., the MIB), the PDSCH (e.g., the SIB type 2), and/or the RRC message (e.g., the dedicated RRC message), the CSS (e.g., the region of the CSS, the control resource set of the CSS). Also, the gNB 160 may transmit, in the CSS, DCI format(s) to a plurality of the UEs 102. The sets of candidates of DL control channel(s) that the UE 102 monitors may be defined in terms of DL control channel(s) CSS. A DL control channel(s) CSS at CCE aggregation level may be defined by the set of candidates of the DL control channel(s).

Here, the CSS may be used for transmission of DCI to a specific UE 102. That is, the gNB 160 may transmit, in the CSS, DCI format(s) intended for a plurality of the UEs 102 and/or DCI format(s) intended for a specific UE 102.

The USS may be used for transmission of DCI to a specific UE 102. That is, the USS is defined by a resource dedicated to a certain UE 102. The USS may be defined independently for each UE 102. For example, the USS may be composed of CCEs having numbers that are determined based on a Radio Network Temporary Identifier (RNTI) (e.g., the C-RNTI), a slot number in a radio frame, an aggregation level, and/or the like. The RNTI(s) may be assigned by the gNB 160. Namely, each of the USSs corresponding to each of the RNTI(s) described below may be defined. For example, the USS may be defined for the DCI format(s) with CRC scrambled by the C-RNTI and/or the CS-RNTI. Also, for example, the gNB 160 may configure, by using the PBCH (e.g., the MIB), the PDSCH (e.g., the SIB type 2), and/or the RRC message (e.g., the dedicated RRC message), the USS (e.g., the region of the USS, the control resource set of the USS). Also, the gNB 160 may transmit, in the USS, DCI format(s) intended for a specific UE 102. The sets of candidates of DL control channel(s) that the UE 102 monitors may be defined in terms of DL control channel(s) USS. A DL control channel(s) USS at CCE aggregation level may be defined by the set of candidates of the DL control channel(s).

Namely, the gNB 160 may transmit, by using the PBCH (e.g., the MIB), the PDSCH (e.g., the SIB type 2), and/or the RRC message (e.g., the dedicated RRC message), information used for configuring one or more control resource sets (i.e., one or more CORESETs). Also, for each of the one or more control resource sets, the CSS(s) and/or the USS may be mapped. For example, in a CORESET (e.g., in a given CORESET), at least, two types of search space (i.e., the CSS and the USS (e.g., a set of the CSS and a set of USS)) may be configured to the UE 102. Also, for example, the gNB 160 may transmit information used for configuring the occasion(s) of DL control channel(s) monitoring (the control resource set monitoring). Here, the DL control channel(s) may be the PCCH(s) (e.g., the PDCCH(s)). Also, the occasion(s) may correspond to a subframe, a slot, a sub-slot, and/or a symbol. Namely, the occasion(s) may correspond to a position(s) (e.g., a timing, a time resource, a time location, a time index, an index of the subframe(s), the slot(s), the sub-slot(s), and/or the symbol(s)). Also, for example, the occasion(s) may correspond to a periodicity (e.g., a periodicity of a subframe, a slot, a sub-slot, and/or a symbol) for which the UE 102 monitors the PDCCH. Namely, the gNB 160 may configure, to the UE 102, a periodicity for monitoring of PDCCH (i.e., PDCCH monitoring periodicity, PDCCH monitoring occasion(s)).

For example, the gNB 160 may transmit, e.g., by using the PBCH (e.g., the MIB), the PDSCH (e.g., the SIB type 2 (i.e., RMSI)), and/or the RRC message (e.g., the dedicated RRC message), information used for configuring the occasion(s) (i.e., the PDCCH monitoring periodicity, the PDCCH monitoring occasion(s)). And, the UE 102 may monitor the PDCCH based on the information used for configuring the occasion(s). Namely, for each search space set in the CORESET, the UE 102 may determine the PDCCH monitoring occasion(s) based on the information used for configuring the occasion(s).

Here, the information used for configuring the CORESET(s) may be configured per serving cell. Namely, the information used for configuring the CORESET(s) may be configured for each of the serving cells (e.g., each of the primary cell and the one or more secondary cells). Also, the information used for configuring the CORESET(s) may be configured per BWP (e.g., per BWP in the serving cell(s)). Namely, the information used for configuring the CORESET(s) may be configured for each of the BWPs (e.g., each of the DL BWP(s)). Also, the information used for configuring the CORESET(s) may be configured DCI format. For example, the information used for configuring the CORESET(s) may be configured for each of the DCI formats (e.g., the DCI format A, the DCI format C, the DCI format D, and/or the DCI format F). Also, the information used for configuring the CORESET(s) may be configured each of the DCI format(s) for the downlink (e.g., the DCI format A, and/or the DCI format C) and the DCI format(s) for the uplink (e.g., the DCI format D, and/or the DCI format F). Also, the information used for configuring the CORESET(s) may be configured for each of the search spaces (e.g., the USS, and/or the CSS(s)).

Also, the information used for configuring the occasion(s) may be configured per serving cell. Namely, the information used for configuring the occasion(s) may be configured for each of the serving cells (e.g., each of the primary cell and the one or more secondary cells). Also, the information used for configuring the occasion(s) may be configured per BWP (e.g., per BWP in the serving cell(s)). Namely, the information used for configuring the occasion(s) may be configured for each of the BWPs (e.g., each of the DL BWP(s)). Also, the information used for configuring the occasion(s) may be configured DCI format. For example, the information used for configuring the occasion(s) may be configured for each of the DCI formats (e.g., the DCI format A, the DCI format C, the DCI format D, and/or the DCI format F). Also, the information used for configuring the occasion(s) may be configured each of the DCI format(s) for the downlink (e.g., the DCI format A, and/or the DCI format C) and the DCI format(s) for the uplink (e.g., the DCI format D, and/or the DCI format F). Also, the information used for configuring the occasion(s) may be configured for each of the search spaces (e.g., the USS, and/or the CSS(s)).

Here, the search space (e.g., the CSS and/or the USS (e.g., a set of the CSS and/or a set of USS)) may be defined based on the number of PDCCH candidates for each aggregation level (e.g., 1, 2, 4, 8, 16), the PDCCH monitoring occasion(s) for the set of the search space(s), and/or each set of search spaces associated with the CORESET. For example, the gNB 160 may configure the number of PDCCH candidates for each aggregation level. Also, the gNB 160 may configure the PDCCH monitoring occasion(s) for the set of the search space(s). Also, the gNB 160 may configure each set of search spaces associated with the CORESET. Namely, for example, an index of the search space may be defined (e.g., computed) based on the number of PDCCH candidates for each aggregation level (e.g., 1, 2, 4, 8, 16), the PDCCH monitoring occasion(s) for the set of the search space(s), and/or each set of search spaces associated with the CORESET.

Here, as described below, the DCI format A may be used for activating and/or deactivating a serving cell(s) (e.g., one or more secondary cell(s), one or more downlink secondary cells, and/or one or more secondary downlink component carriers). Also, the DCI format A may be used for activating and/or deactivating a bandwidth part(s) (e.g., one or more BWPs in a serving cell(s), one or more DL BWPs in a serving cell(s)). Also, the C-RNTI (i.e., a first C-RNTI), the SPS C-RNTI (i.e., a second C-RNTI), and/or the CS-RNTI may be used to transmit the DCI format A. Here, the DCI format A may be monitored (e.g., transmitted, mapped) in the CSS and the USS.

For example, the DCI format A may include resource assignment information (e.g., the resource assignment of the PDSCH). For example, the DCI format A may include frequency domain resource assignment information. Also, the DCI format A may include time domain resource assignment information. Also, the DCI format A may include information used for indicating a modulation and coding scheme (e.g., a MCS information, a MCS field(s)). Also, the DCI format A may include information (e.g., a new data indicator) used for indicating whether a transmission is a new transmission or not. Also, the DCI format A may include information (e.g., a CSI request, a CSI request field(s)) used for requesting transmission of CSI (i.e., CSI report, aperiodic CSI report (i.e., aperiodic CSI reporting)) on the PUSCH and/or the PUCCH. Also, the DCI format A may include information (i.e., a carrier indicator, a carrier indicator field(s), e.g., 3-bit information field(s)) used for indicating a serving cell(s) (e.g., a carrier(s)). For example, the carrier indicator may be used for indicating the serving cell(s) in which the corresponding PDSCH(s) is scheduled. Also, the DCI format A may include information (i.e., a BWP indicator, a BWP indicator field(s), e.g., 1-bit or 2-bit information field(s)) used for indicating a BWP(s). For example, the BWP indicator may be used for indicating the BWP(s) (e.g., the DL BWP(s)) that is activated. Also, the BWP indicator may be used for indicating the DL BWP(s) in which the corresponding PDSCH(s) is scheduled. Also, the DCI format A may include information used for indicating a transmission power control (TPC) command for the PUCCH.

Also, as described above, the DCI format B may be used for scheduling of the downlink PSCH (e.g., the PDSCH). Namely, the DCI format B may be a scheduling DCI. Also, the C-RNTI (i.e., the first C-RNTI), SPS C-RNTI (i.e., the second C-RNTI), and/or the CS-RNTI may be used to transmit the DCI format B. Here, the DCI format B may be monitored (e.g., transmitted, mapped) in the CSS only.

For example, the DCI format B may include resource assignment information (e.g., the resource assignment of the PDSCH). For example, the DCI format B may include frequency domain resource assignment information. Also, the DCI format B may include time domain resource assignment information. Also, the DCI format B may include information used for indicating a modulation and coding scheme (e.g., a MCS information, a MCS field(s)). Also, the DCI format B may include information (e.g., a new data indicator) used for indicating whether a transmission is a new transmission or not. Also, the DCI format B may include information (e.g., a CSI request, a CSI request field(s)) used for requesting transmission of CSI (i.e., CSI report, aperiodic CSI report (i.e., aperiodic CSI reporting)) on the PUSCH and/or the PUCCH. Also, the DCI format B may include information used for indicating a transmission power control (TPC) command for the PUCCH. Namely, the DCI format B may not include the carrier indicator (e.g., the carrier indicator field(s)). Also, the DCI format B may not include the BWP indicator (e.g., the BWP indicator field(s)).

Also, as described above, the DCI format C may be used for activating, deactivating, and/or switching the serving cell(s) and/or the BWP(s). Namely, the DCI format C may be an activating/deactivating/switching DCI. Here, the C-RNTI (i.e., the first C-RNTI), SPS C-RNTI (i.e., the second C-RNTI), and/or the CS-RNTI may be used to transmit the DCI format C. Also, the DCI format C may be monitored (e.g., transmitted, mapped) in the CSS and the USS.

And, in a case that the DCI format A is received (i.e., based on the detection of the DCI format A), the UE 102 may receive (i.e., decode, detect) the scheduled PDSCH. Also, in a case that the DCI format B is received (i.e., based on the detection of the DCI format B), the UE 102 may receive (i.e., decode, detect) the scheduled PDSCH. Also, in a case that the DCI format C is received (i.e., based on the detection of the DCI format C), the UE 102 may perform activation, deactivation and/or switching for the indicated serving cell(s) (e.g., the serving cell(s) used for receiving the downlink signal, and/or a downlink communication).

Here, for example, in a case that the carrier indicator (e.g., included in the DCI format A, and/or the DCI format C) is set to a first value(s) (e.g., 3-bit information field(s) of the carrier indicator is set to "000"), the primary cell (e.g., a downlink primary component carrier: DL PCC) may be indicated (i.e., by using the carrier indicator field(s)). Namely, for example, an index (e.g., a serving cell index) of the primary cell (e.g., the DL PCC) may be corresponding to a value of "000". Namely, a value of "0" may be applied for the primary cell (i.e., the serving cell index of the primary cell (e.g., the DL PCC)). Also, in a case that the carrier indicator is set a value(s) other than the first value(s), the secondary cell(s) (e.g., a downlink secondary component carrier(s): DL SCC(s)) may be indicated (i.e., by using the carrier indicator field(s)). Namely, an index (e.g., the serving cell index, a secondary cell index) of the secondary cell(s) (e.g., the DL SCC(s)) may be corresponding to a value(s) other than the first value(s). For example, the gNB 160 may transmit, by using the PBCH (e.g., the MIB), the PDSCH (e.g., the SIB type 2 (i.e., RMSI)), and/or the RRC message (e.g., the dedicated RRC message), information used for configuring (e.g., assigning) the secondary cell index. And, the secondary cell index configured (assigned) may be applied for the secondary cell(s) (e.g., as the serving cell index of the secondary cell(s) (e.g., the DL SCC(s))). For example, a value(s) of "1", "2", "3", "4", "5", "6", and/or "7" may be applied for the secondary cell(s) (i.e., the serving cell index of the secondary cell(s) (e.g., the DL SCC(s))). Here, the first value(s) may be specified, in advance, by the specification and known information between the gNB 160 and the UE 102. Namely, the first value(s) may be a first predetermined value(s).

Also, for example, in a case that the BWP indicator (e.g., included in the DCI format A, and/or the DCI format C) is set to a second value(s) (e.g., 1-bit information field(s) of the BWP indicator is set to "0", and/or 2-bit information field(s) of the BWP indicator is set to "00"), an initial active BWP(s) (e.g., an initial active DL BWP(s)) and/or a default BWP(s) (e.g., a default DL BWP(s)) may be indicated. For example, in a case that the default BWP(s) (e.g., the default DL BWP(s)) is not configured and the BWP indicator is set to the second value(s), the initial active BWP(s) (e.g., the initial active DL BWP(s)) may be indicated (i.e., by using the BWP indicator field(s)). Also, in a case that the default BWP(s) (e.g., the default DL BWP(s)) is configured and the BWP indicator is set to the second value(s), the default BWP(s) (e.g., the default DL BWP(s)) may be indicated (i.e., by using the BWP indicator field(s)). Namely, in a case that only the initial active BWP(s) (e.g., the initial active DL BWP(s)) is given (i.e., the default BWP(s) (e.g., the default DL BWP(s)) is not configured), the BWP indicator set to the second value(s) may be used for indicating the initial active BWP(s) (e.g., the initial active DL BWP(s)). Also, in a case that the default BPW(s) (e.g., the default DL BWP(s)) is configured, the BWP indicator set to the second value(s) may be used for indicating the default BWP(s) (e.g., the default DL BWP(s)). Namely, based on whether or not the default BWP(s) (e.g., the default DL BWP(s)) is configured, the same second value(s) of the BWP indicator field(s) may be used for indicating the initial active BWP(s) (e.g., the initial active DL BWP(s)) (e.g., if the default BWP is not configured), or the default BWP(s) (e.g., the default DL BWP(s)) (e.g., if the default BWP is configured).

Also, for example, an index (e.g., a BWP index) of the initial active BWP(s) (e.g., the initial active DL BWP(s)) (e.g., if the default BWP(s) is not configured) may be corresponding to a value of "00". Namely, a value of "0" may be applied for the initial active BWP(s) (e.g., the initial active DL BWP(s)) (e.g., if the default BWP(s) is not configured). Namely, the value of "0" may be the index (e.g. the BWP index) of the initial active BWP(s) (e.g., the initial active DL BWP(s)). Also, for example, the index (e.g., the BWP index) of the default BWP(s) (e.g., the default DL BWP(s)) (e.g., if the default BWP(s) is configured) may be corresponding to the value of "00". Namely, the value of "0" may be applied for the default BWP(s) (e.g., the default DL BWP(s)) (e.g., if the default BWP(s) is configured). Namely, the value of "0" may be the index (e.g. the BWP index) of the default BWP(s) (e.g., the default DL BWP(s)). Namely, the value of "0" may be used for the index (e.g., the BWP index) of the initial active BWP(s) (e.g., the initial active DL BWP(s)). Namely, the value of "0" may be used for the index (e.g., the BWP index) of the default BWP(s) (e.g., the default DL BWP(s)).

Also, in a case that the BWP indicator is set a value(s) other than the second value(s), the BWP(s) other than the initial BWP(s) (e.g., the initial DL BWP(s)) and/or the default BWP(s) (e.g., the default DL BWP(s)) may be indicated (i.e., by using the BWP indicator field(s)). Here, the BWP(s) other than the initial BWP(s) (e.g., the initial DL BWP(s)) and/or the default BWP(s) (e.g., the default DL BWP(s)) may be a secondary BWP(s) (e.g., a secondary DL BWP(s)). Namely, an index of the secondary DL BWP(s) (e.g., a secondary DL BWP index) may be corresponding to a value(s) other than the second value(s). For example, the gNB 160 may transmit, by using the PBCH (e.g., the MIB), the PDSCH (e.g., the SIB type 2 (i.e., RMSI)), and/or the RRC message (e.g., the dedicated RRC message), information used for configuring (e.g., assigning) the index of the secondary DL BWP(s). And, the index of the secondary DL BWP(s) configured (assigned) may be applied for the secondary DL BWP(s). For example, a value(s) of "1", "2", and/or "3" may be applied for the secondary DL BWP(s) (i.e., the BWP index of the secondary DL BWP(s)). Here, the second value(s) may be specified, in advance, by the specification and known information between the gNB 160 and the UE 102. Namely, the second value(s) may be a second predetermined value(s).

Here, the index of the BWP(s) (e.g., the index of the DL BWP(s) (e.g., the index of the initial active DL BWP(s), the index of the default DL BWP(s), and/or the index of the active DL BWP) may be the identifier of BWP(s) (e.g., DL BWP ID). Also, the index of the BWP(s) (e.g., the index of the DL BWP(s) (e.g., the index of the initial active DL BWP(s), the index of the default DL BWP(s), and/or the index of the active DL BWP(s)) may be an index of BWP(s) for the PDCCH. Also, the index of the BWP(s) (e.g., the index of the DL BWP(s) (e.g., the index of the initial active DL BWP(s), the index of the default DL BWP(s), and/or the index of the active DL BWP(s)) may be an index of BWP(s) for the PDSCH. Namely, the index of the BWP(s) (e.g., the index of the DL BWP(s) (e.g., the index of the initial active DL BWP(s), the index of the default DL BWP(s), and/or the index of the active DL BWP(s)) may be an index of the PDCCH (e.g., the PDCCH BWP). Also, the index of the BWP(s) (e.g., the index of the DL BWP(s) (e.g., the index of the initial active DL BWP(s), the index of the default DL BWP(s), and/or the index of the active DL BWP(s)) may be an index of the PDSCH (e.g., the PDSCH BWP).

Here, as described below, the DCI format D may be used for activating and/or deactivating a serving cell(s) (e.g., one or more secondary cell(s), one or more uplink secondary cells, and/or one or more uplink component carriers). Also, the DCI format D may be used for activating and/or deactivating a bandwidth part(s) (e.g., one or more BWPs in a serving cell(s), one or more UL BWPs in a serving cell(s)). Also, the C-RNTI (i.e., a first C-RNTI), the SPS C-RNTI (i.e., a second C-RNTI), and/or the CS-RNTI may be used to transmit the DCI format D. Here, the DCI format A may be monitored (e.g., transmitted, mapped) in the CSS and the USS.

For example, the DCI format D may include resource assignment information (e.g., the resource assignment of the PUSCH). For example, the DCI format D may include frequency domain resource assignment information. Also, the DCI format D may include time domain resource assignment information. Also, the DCI format D may include information used for indicating a modulation and coding scheme (e.g., a MCS information, a MCS field(s)). Also, the DCI format A may include information (e.g., a new data indicator) used for indicating whether a transmission is a new transmission or not. Also, the DCI format D may include information (e.g., a CSI request, a CSI request field(s)) used for requesting transmission of CSI (i.e., CSI report, aperiodic CSI report (i.e., aperiodic CSI reporting)) on the PUSCH and/or the PUCCH. Also, the DCI format D may include information (i.e., a carrier indicator, a carrier indicator field(s), e.g., 3-bit information field(s)) used for indicating a serving cell(s) (e.g., a carrier(s)). For example, the carrier indicator may be used for indicating the serving cell(s) in which the corresponding PUSCH(s) is scheduled. Also, the DCI format D may include information (i.e., a BWP indicator, a BWP indicator field(s), e.g., 1-bit or 2-bit information field(s)) used for indicating a BWP(s). For example, the BWP indicator may be used for indicating the BWP(s) (e.g., the UL BWP(s)) that is activated. Also, the BWP indicator may be used for indicating the UL BWP(s) in which the corresponding PUSCH(s) is scheduled. Also, the DCI format D may include information used for indicating a transmission power control (TPC) command for the PUSCH.

Also, as described above, the DCI format E may be used for scheduling of the uplink PSCH (e.g., the PUSCH). Namely, the DCI format E may be a scheduling DCI. Also, the C-RNTI (i.e., the first C-RNTI), SPS C-RNTI (i.e., the second C-RNTI), and/or the CS-RNTI may be used to transmit the DCI format E. Here, the DCI format E may be monitored (e.g., transmitted, mapped) in the CSS only.

For example, the DCI format E may include resource assignment information (e.g., the resource assignment of the PUSCH). For example, the DCI format E may include frequency domain resource assignment information. Also, the DCI format E may include time domain resource assignment information. Also, the DCI format E may include information used for indicating a modulation and coding scheme (e.g., a MCS information, a MCS field(s)). Also, the DCI format E may include information (e.g., a new data indicator) used for indicating whether a transmission is a new transmission or not. Also, the DCI format E may include information (e.g., a CSI request, a CSI request field(s)) used for requesting transmission of CSI (i.e., CSI report, aperiodic CSI report (i.e., aperiodic CSI reporting)) on the PUSCH and/or the PUCCH. Also, the DCI format E may include information used for indicating a transmission power control (TPC) command for the PUCCH. Namely, the DCI format E may not include the carrier indicator (e.g., the carrier indicator field(s)). Also, the DCI format E may not include the BWP indicator (e.g., the BWP indicator field(s)).

Also, as described above, the DCI format F may be used for activating, deactivating, and/or switching the serving cell(s) and/or the BWP(s). Namely, the DCI format F may be an activating/deactivating/switching DCI. Here, the C-RNTI (i.e., the first C-RNTI), SPS C-RNTI (i.e., the second C-RNTI), and/or the CS-RNTI may be used to transmit the DCI format F. Also, the DCI format F may be monitored (e.g., transmitted, mapped) in the CSS and the USS.

And, in a case that the DCI format D is received (i.e., based on the detection of the DCI format D), the UE 102 may perform the PUSCH transmission. Also, in a case that the DCI format E is received (i.e., based on the detection of the DCI format E), the UE 102 may perform the PUSCH transmission. Also, in a case that the DCI format F is received (i.e., based on the detection of the DCI format F), the UE 102 may perform activation, deactivation and/or switching for the indicated serving cell(s) (e.g., the serving cell(s) used for receiving the downlink signal and/or the downlink communication, and/or the serving cell(s) used for transmitting the uplink signal and/or the uplink communication).

Here, for example, in a case that the carrier indicator (e.g., included in the DCI format C, and/or the DCI format F) is set to a third value(s) (e.g., 3-bit information field(s) of the carrier indicator is set to "000"), the primary cell (e.g., an uplink primary component carrier: UL PCC) may be indicated (i.e., by using the carrier indicator field(s)). Namely, for example, an index (e.g., a serving cell index) of the primary cell (e.g., the UL PCC) may be corresponding to a value of "000". Namely, a value of "0" may be applied for the primary cell (i.e., the serving cell index of the primary cell (e.g., the UL PCC)). Also, in a case that the carrier indicator is set a value(s) other than the third value(s), the secondary cell(s) (e.g., an uplink secondary component carrier: UL SCC(s)) may be indicated (i.e., by using the carrier indicator field(s)). Namely, an index (e.g., the serving cell index, a secondary cell index) of the secondary cell(s) (e.g., the UL SCC(s)) may be corresponding to a value(s) other than the third value(s). For example, the gNB 160 may transmit, by using the PBCH (e.g., the MIB), the PDSCH (e.g., the SIB type 2 (i.e., RMSI)), and/or the RRC message (e.g., the dedicated RRC message), information used for configuring (e.g., assigning) the secondary cell index. And, the secondary cell index configured (assigned) may be applied for the secondary cell(s) (e.g., as the serving cell index of the secondary cell(s) (e.g., the UL SCC(s))). For example, a value(s) of "1", "2", "3", "4", "5", "6", and/or "7" may be applied for the secondary cell(s) (i.e., the serving cell index of the secondary cell(s) (e.g., the UL SCC(s))). Here, the third value(s) may be specified, in advance, by the specification and known information between the gNB 160 and the UE 102. Namely, the third value(s) may be a third predetermined value(s). Here, the third value(s) may be the first value(s).

Also, for example, in a case that the BWP indicator (e.g., included in the DCI format C, and/or the DCI format F) is set to a fourth value(s) (e.g., 1-bit information field(s) of the BWP indicator is set to "0", and/or 2-bit information field(s) of the BWP indicator is set to "00"), an initial active BWP(s) (e.g., an initial active UL BWP(s)) and/or a default BWP(s) (e.g., a default UL BWP(s)) may be indicated. For example, in a case that the default BWP(s) (e.g., the default UL BWP(s)) is not configured and the BWP indicator is set to the fourth value(s), the initial active BWP(s) (e.g., the initial active UL BWP(s)) may be indicated (i.e., by using the BWP indicator field(s)). Also, in a case that the default BWP(s) (e.g., the default UL BWP(s)) is configured and the BWP indicator is set to the fourth value(s), the default BWP(s) (e.g., the default UL BWP(s)) may be indicated (i.e., by using the BWP indicator field(s)). Namely, in a case that only the initial active BWP(s) (e.g., the initial active UL BWP(s)) is given (i.e., the default BWP(s) (e.g., the default UL BWP(s)) is not configured), the BWP indicator set to the fourth value(s) may be used for indicating the initial active BWP(s) (e.g., the initial active UL BWP(s)). Also, in a case that the default BPW(s) (e.g., the default UL BWP(s)) is configured, the BWP indicator set to the fourth value(s) may be used for indicating the default BWP(s) (e.g., the default UL BWP(s)). Namely, based on whether or not the default BWP(s) (e.g., the default UL BWP(s)) is configured, the same fourth value(s) of the BWP indicator field(s) may be used for indicating the initial active BWP(s) (e.g., the initial active UL BWP(s)) (e.g., if the default BWP is not configured), or the default BWP(s) (e.g., the default UL BWP(s)) (e.g., if the default BWP is configured).

Also, for example, an index (e.g., a BWP index) of the initial active BWP(s) (e.g., the initial active UL BWP(s)) (e.g., if the default BWP(s) is not configured) may be corresponding to a value of "00". Namely, a value of "0" may be applied for the initial active BWP(s) (e.g., the initial active UL BWP(s)) (e.g., if the default BWP(s) is not configured). Namely, the value of "0" may be the index (e.g. the BWP index) of the initial active BWP(s) (e.g., the initial active UL BWP(s)). Also, for example, the index (e.g., the BWP index) of the default BWP(s) (e.g., the default UL BWP(s)) (e.g., if the default BWP(s) is configured) may be corresponding to the value of "00". Namely, the value of "0" may be applied for the default BWP(s) (e.g., the default UL BWP(s)) (e.g., if the default BWP(s) is configured). Namely, the value of "0" may be the index (e.g. the BWP index) of the default BWP(s) (e.g., the default UL BWP(s)). Namely, the value of "0" may be used for the index (e.g., the BWP index) of the initial active BWP(s) (e.g., the initial active UL BWP(s)). Namely, the value of "0" may be used for the index (e.g., the BWP index) of the default BWP(s) (e.g., the default UL BWP(s)).

Also, in a case that the BWP indicator is set a value(s) other than the fourth value(s), the BWP(s) other than the initial BWP(s) (e.g., the initial UL BWP(s)) and/or the default BWP(s) (e.g., the default UL BWP(s)) may be indicated (i.e., by using the BWP indicator field(s)). Here, the BWP(s) other than the initial BWP(s) (e.g., the initial UL BWP(s)) and/or the default BWP(s) (e.g., the default UL BWP) may be a secondary BWP(s) (e.g., a secondary UL BWP(s)). Namely, an index of the secondary BWP(s) (e.g., a secondary BWP index) may be corresponding to a value(s) other than the fourth value(s). For example, the gNB 160 may transmit, by using the PBCH (e.g., the MIB), the PDSCH (e.g., the SIB type 2 (i.e., RMSI)), and/or the RRC message (e.g., the dedicated RRC message), information used for configuring (e.g., assigning) the index of the secondary BWP(s). And, the index of the secondary BWP(s) configured (assigned) may be applied for the secondary BWP(s). For example, a value(s) of "1", "2", and/or "3" may be applied for the secondary BWP(s) (i.e., the BWP index of the secondary BWP(s)). Here, the fourth value(s) may be specified, in advance, by the specification and known information between the gNB 160 and the UE 102. Namely, the fourth value(s) may be a fourth predetermined value(s). Here, the fourth value(s) may be the second value(s).

Here, the index of the BWP(s) (e.g., the index of the UL BWP(s) (e.g., the index of the initial active UL BWP(s), the index of the default UL BWP(s), and/or the index of the active UL BWP(s)) may be the identifier of BWP(s) (e.g., UL BWP ID). Also, the index of the BWP(s) (e.g., the index of the UL BWP(s) (e.g., the index of the initial active UL BWP(s), the index of the default UL BWP(s), and/or the index of the active UL BWP(s)) may be an index of BWP(s) for the PDCCH. Also, the index of the BWP(s) (e.g., the index of the UL BWP(s) (e.g., the index of the initial active UL BWP(s), the index of the default UL BWP(s), and/or the index of the active UL BWP(s)) may be an index of BWP(s) for the PUSCH. Namely, the index of the BWP(s) (e.g., the index of the UL BWP(s) (e.g., the index of the initial active UL BWP(s), the index of the default UL BWP(s), and/or the index of the active UL BWP(s)) may be an index of the PDCCH (e.g., the PDCCH BWP). Also, the index of the BWP(s) (e.g., the index of the UL BWP(s) (e.g., the index of the initial active UL BWP(s), the index of the default UL BWP(s), and/or the index of the active UL BWP(s)) may be an index of the PUSCH (e.g., the PUSCH BWP).

Here, the gNB 160 may transmit, by using the PBCH (e.g., the MIB), the PDSCH (e.g., the SIB type 2), and/or the RRC message (e.g., the dedicated RRC message), information (e.g., first information) used for configuring whether the carrier indicator field(s) is present or not in the DCI format(s) (e.g., the DCI format A, the DCI format C, the DCI format D and/or the DCI format F). Namely, whether or not the carrier indicator is present in the DCI format(s) may be configured by the gNB 106. Namely, the first information may be used for configuring (e.g., indicating) whether the carrier indicator field is present or not in the DCI format(s).

And, the UE 102 may decode (e.g., detect, receive) the DCI format(s) based on the first information.

Also, the gNB 160 may transmit, by using the PBCH (e.g., the MIB), the PDSCH (e.g., the SIB type 2), and/or the RRC message (e.g., the dedicated RRC message), information (e.g., second information) used for configuring whether the BWP indicator field(s) is present or not in the DCI format(s) (e.g., the DCI format A, the DCI format C, the DCI format D and/or the DCI format F). Namely, whether or not the BWP indicator is present in the DCI format(s) may be configured by the gNB 106. Namely, the second information may be used for configuring (e.g., indicating) whether the BWP indicator field is present or not in the DCI format(s). And, the UE 102 may decode (e.g., detect, receive) the DCI format(s) based on the second information. Here, the second information may be used for configuring (e.g., indicating) the number of the BWP(s) (e.g., the DL BWP(s) and/or the UL BWP(s)). For example, in a case that two DL BWPs are configured by using the second information, 1-bit BWP indicator field(s) may be applied for the DCI format(s) (e.g., the DCI format A, and/or the DCI format C). Also, in a case that four DL BWPs are configured by using the second information, 2-bit BWP indicator may be applied for the DCI format(s) (e.g., the DCI format A, and/or the DCI format C). Namely, the bit-width (e.g., the number of bits) for the BWP indicator field(s) included in the DCI format(s) (e.g., the DCI format A, and/or the DCI format C) may be determined based on the number of the DL BWP(s) for the PDSCH (e.g., the BWP configuration for the PDSCH). Also, in a case that two UL BWPs are configured by using the second information, 1-bit BWP indicator field(s) may be applied for the DCI format(s) (e.g., the DCI format D, and/or the DCI format F). Also, in a case that four UL BWPs are configured by using the second information, 2-bit BWP indicator may be applied for the DCI format(s) (e.g., the DCI format D, and/or the DCI format F). Namely, the bit-width (e.g., the number of bits) for the BWP indicator field(s) included in the DCI format(s) (e.g., the DCI format D, and/or the DCI format F) may be determined based on the number of the UL BWP(s) for the PUSCH (e.g., the BWP configuration for the PUSCH).

Here, the initial active DL BWP(s) may be defined by a location and number of contiguous PRBs (i.e., physical resource blocks), a subcarrier spacing, and/or a cyclic prefix, for the control resource set for the Type0-PDCCH common search space. Here, the initial active UL BWP(s) may be linked to (e.g., paired with) the initial active DL BWP(s). Also, the gNB 160 may transmit, by using the PBCH (e.g., MIB), the RMSI (e.g., SIB2), and/or the RRC message, information used for configuring the initial active UL BWP(s). Also, the gNB 160 may transmit, by using the PBCH (e.g., MIB), the RMSI (e.g., SIB2), and/or the RRC message, information used for configuring the initial active DL BWP(s). Namely, the UE 102 may determine the initial active DL BWP(s) and/or the initial active UL BWP(s) based on the information from the gNB 160. For example, the initial active DL BWP(s) and/or the initial active UL BWP(s) may be used for the random access procedure. For example, for operation on the primary cell, the initial active DL BWP(s) and/or the initial active UL BWP(s) may be used for the random access procedure.

For example, based on an initiation of the random access procedure, in a case that the PRACH resources are configured for the activate UL BWP(s), the UE 102 may perform the random access procedure on the active DL BWP(s) and the activate UL BWP(s). Here, an active DL BWP(s) may be linked to (e.g., paired with) an active UL BWP for which the PRACH resources are configured. Also, based on the initiation of the random access procedure, in a case that the PRACH resources are not configured for the active UL BWP, the UE 102 may perform the random access procedure on the initial active DL BWP(s) and the initial active UL BWP(s). Namely, for the random access procedure, the UE 102 may switch to the initial active DL BWP(s) and the initial active UL BWP(s). For example, in a case that the default BWP(s) (e.g., the default DL BWP(s) and/or the default UL BWP(s)) is not configured and the PRACH resources are not configured for the active BWP(s) (e.g., the active DL BWP(s) and/or the active UL BWP(s)), the UE 102 perform the random access procedure on the initial active DL BWP(s) and the initial active UL BWP(s).

Also, the gNB 160 may transmit, by using the PBCH (e.g., MIB), the RMSI (e.g., SIB2), and/or the RRC message, information used for configuring the default DL BWP(s) and/or the default UL BWP(s). Namely, the UE 102 may determine the default DL BWP(s) and/or the default UL BWP(s) based on the information from the gNB 160. Here, the default DL BWP(s) may be configured among configured DL BWP(s). Also, the default UL BWP(s) may be configured among configured UL BWP(s). Also, based on the initiation of the random access procedure, in a case that the default BWP(s) (e.g., the default DL BWP(s) and/or the default UL BWP(s)) is configured and the PRACH resources are not configured for the activate BWP(s) (e.g., the active DL BWP(s) and/or the active UL BWP(s)), the UE 102 may perform the random access procedure on the default DL BWP(s) and the default UL BWP(s). Namely, for the random access procedure, the UE 102 may switch to the default DL BWP(s) and the default UL BWP(s).

For example, for serving cell(s), the gNB 160 may transmit, by using the PBCH (e.g., MIB), the RMSI (e.g., SIB2), and/or the RRC message (e.g., the dedicated RRC message), information used for configuring a set of four DL BWPs (e.g., at most four DL BWPs, a DL BWP set) (e.g., for receptions by the UE 102). Also, for the serving cell(s), the gNB 160 may transmit, by using the PBCH (e.g., MIB), the RMSI (e.g., SIB2), and/or the RRC message (e.g., the dedicated RRC message), information used for configuring a set of four UL BWP(s) (e.g., at most four UL BWPs, a UL BWP set). For example, for each DL BWP in the set of DL BWPs, the gNB 160 may configure, by using the PBCH (e.g., MIB), the RMSI (e.g., SIB2), and/or the RRC message (e.g., the dedicated RRC message), the subcarrier spacing, the cyclic prefix, a number of contiguous PRBs (e.g., a bandwidth of PRBs), an index (e.g., the index of the DL BWP(s), the DL BWP ID) in the set of DL BWPs. Also, for each UL BWP in the set of UL BWPs, the gNB 160 may configure, by using the PBCH (e.g., MIB), the RMSI (e.g., SIB2), and/or the RRC message (e.g., the dedicated RRC message), the subcarrier spacing, the cyclic prefix, a number of contiguous PRBs (e.g., a bandwidth of PRBs), an index (e.g., the index of the UL BWP(s), the UL BWP ID) in the set of UL BWPs. Also, for each DL BWP or UL BWP in the set of DL BWPs or UL BWPs, respectively, the gNB 160 may configure, by using the PBCH (e.g., MIB), the RMSI (e.g., SIB2), and/or the RRC message (e.g., the dedicated RRC message), a link (e.g., a linking, a pairing, a correspondence, and/or a mapping) between the DL BWP and the UL BWP from the set of configured DL BWP(s) and UL BWP(s). For example, the gNB 160 may configure BWP(s) per serving cell for the uplink (e.g., if the serving cell is configured with the uplink) and for the downlink.

And, the UE 102 may perform, based on the configuration(s) for the DL BWP(s), reception(s) on the PDCCH in the DL BWP(s) and/or reception(s) on the PDSCH in the DL BWP(s). For example, the UE 102 may perform, based on the configured subcarrier spacing and cyclic prefix (e.g., the cyclic prefix length) for the DL BWP(s), the reception(s) on the PDCCH in the DL BWP(s) and/or the reception(s) on the PDSCH in the DL BWP(s). Also, the UE 102 may perform, based on the configuration(s) for the UL BWP(s), transmission(s) on the PUCCH in the UL BWP(s) and/or transmission(s) on the PUSCH in the UL BWP(s). For example, the UE 102 may perform, based on the configured subcarrier spacing and cyclic prefix (e.g., the cyclic prefix length) for the UL BWP(s), the transmission(s) on the PUCCH in the UL BWP(s) and/or the transmission(s) on the PUSCH in the UL BWP(s).

Also, the BWP indicator field(s) is configured, as described above, in the DCI format(s) for the downlink, a value(s) of the BWP indicator field(s) may be used for indicating the active DL BWP(s), from the configured set of the DL BWP(s), for downlink reception(s) (e.g., the reception(s) on the PDCCH, and/or the reception(s) on the PDSCH). Also, the BWP indicator field(s) is configured, as described above, in the DCI format(s) for the uplink, a value(s) of the BWP indicator field(s) may be used for indicating the active UL BWP(s), from the configured set of the UL BWP(s), for uplink transmission(s) (e.g., the transmission(s) on the PUCCH, and/or the transmission(s) on the PUSCH).

Also, the gNB 160 may configure, e.g., by using the PBCH (e.g., MIB), the RMSI (e.g., SIB2), and/or the RRC message, a bandwidth of the CORESET for the RMSI. And, the bandwidth of the initial active DL BWP(s) (e.g., the number of PRBs of the initial active DL BWP(s)) may be determined based on (e.g., the same as) the bandwidth of the CORESET for the RMSI. For example, the initial active DL BWP(s) may be defined as a frequency location and the bandwidth of the CORESET for the RMSI, and/or the subcarrier spacing of the RMSI (e.g., the subcarrier spacing for the CORESET for the RMSI) (i.e., the subcarrier spacing of the PDSCH used for transmitting the RMSI (e.g., SIB2)).

Figure 5:
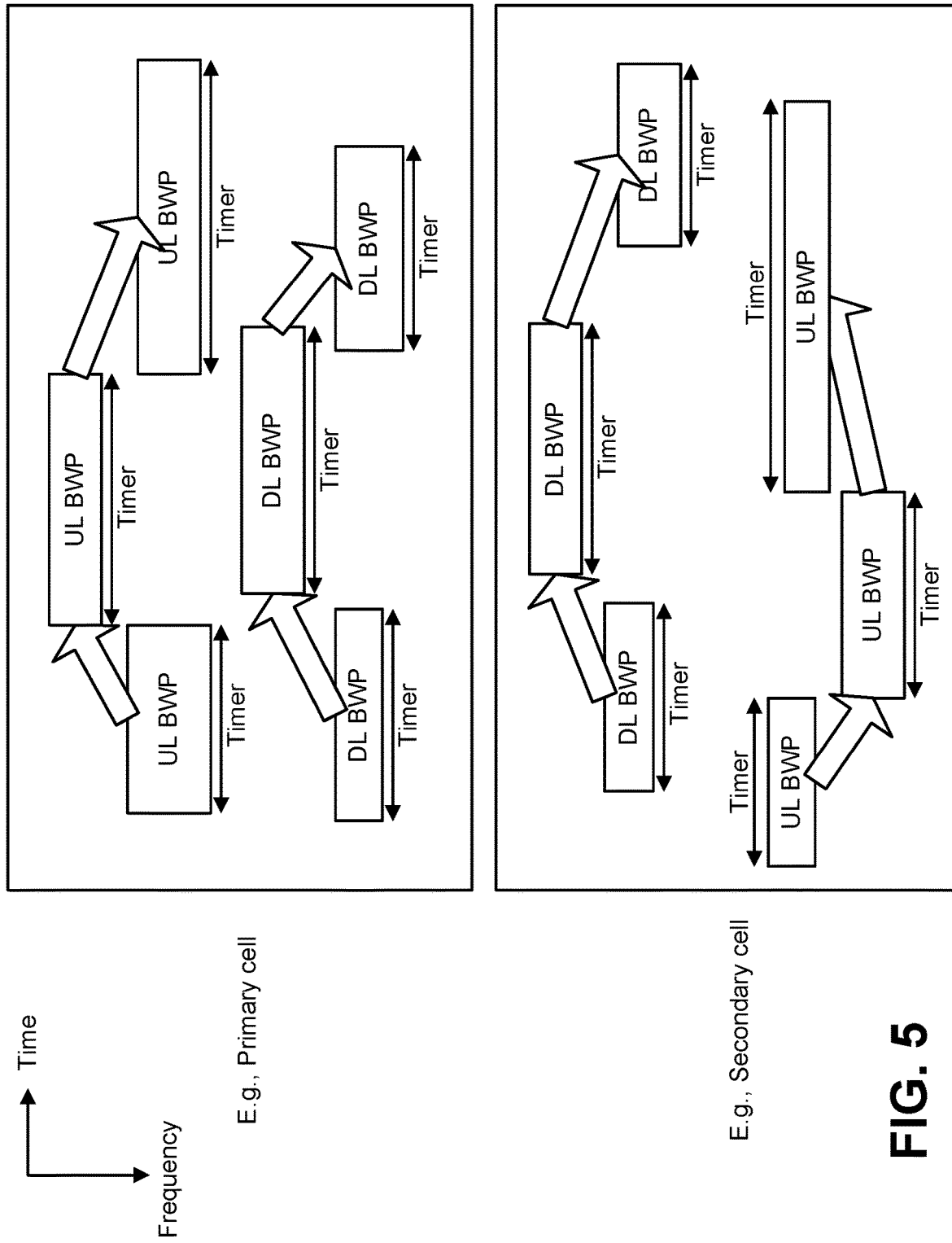
FIG. 5 illustrates an example of the downlink and/or uplink transmissions.

FIG. 5 illustrates an example of the downlink and/or uplink transmissions. As showed by FIG. 5, one or more serving cells may be configured to the UE 102. In the carrier aggregation (CA), the gNB 160 and the UE 102 may communicate each other using the one more serving cells. Here, the configured one or more serving cells may include one primary cell and one or more secondary cell. For example, the primary cell may be a serving cell on which an initial connection establishment procedure (e.g., the random access procedure) is performed. Also, the primary cell may be a serving cell on which a connection re-establishment procedure is performed. Also, the primary cell may be a serving cell that is indicated as the primary cell (e.g., indicated as the primary cell during the handover procedure). For example, the gNB 160 may transmit, by using the PBCH (e.g., the MIB), the PDSCH (e.g., the SIB type 2), and/or the RRC message (e.g., the dedicated RRC message), information used for configuring the primary cell. Also, the gNB 160 may transmit, by using the PBCH (e.g., the MIB), the PDSCH (e.g., the SIB type 2), and/or the RRC message (e.g., the dedicated RRC message), information used for configuring one or more secondary cells to form together with the primary cell a set of serving cells. Here, in the downlink, a carrier corresponding to the primary cell may be the downlink primary component carrier (i.e., the DL PCC), and a carrier corresponding to a secondary cell may be the downlink secondary component carrier (i.e., the DL SCC). Also, in the uplink, a carrier corresponding to the primary cell may be the uplink primary component carrier (i.e., the UL PCC), and a carrier corresponding to the secondary cell may be the uplink secondary component carrier (i.e., the UL SCC).

Here, the primary cell may be used for transmitting on the PUCCH. Namely, the UE 102 may perform the transmission on the PUCCH in the primary cell. Also, the primary cell may not be deactivated. Also, a cross-carrier scheduling may not be applied to the primary cell. Namely, the primary cell may be always scheduled via its PDCCH (i.e., the PDCCH of the primary cell). Also, in a case that the PDCCH (e.g., the PDCCH monitoring, the PDCCH monitoring occasion(s)) of the secondary cell is configured, the cross-carrier scheduling may not be applied to the secondary cell. Namely, in the case that the PDCCH of the secondary cell is configured, the secondary cell may be always scheduled via its PDCCH (i.e., the PDCCH of the secondary cell). Also, in a case that the PDCCH (e.g., the PDCCH monitoring, the PDCCH monitoring occasion(s)) of the secondary cell is not configured, the cross-carrier scheduling may be applied to the secondary cell. Namely, in the case that the PDCCH of the secondary cell is not configured, the secondary cell may be scheduled via the PDCCH of one other serving cell.

Here, a link (e.g., a linking, a pairing, a correspondence, and/or a mapping) may be defined between the uplink (e.g., the uplink component carrier) and the downlink (e.g., the downlink component carrier). For example, the gNB 160 may transmit, by using the PBCH (e.g., the MIB), the PDSCH (e.g., the SIB type 2), and/or the RRC message (e.g., the dedicated RRC message), information used for configuring the linking between the uplink and the downlink. Namely, a serving cell in which the transmission on the PDSCH is performed based on the scheduling by using the DCI format(s) (i.e., the DCI format(s) for the downlink (i.e., a downlink assignment)) may be identified based on the linking. Also, a serving cell in which the transmission on the PUSCH is performed based on the scheduling by using the DCI format(s) (i.e., the DCI format(s) for the uplink (i.e., an uplink grant)) may be identified based on the linking.

Also, as described above, an activation and/or a deactivation mechanism of the serving cell(s) may be supported. Here, the primary cell may be always activated. For example, the gNB 160 may transmit, e.g., by using the higher layer signal (e.g., the MAC CE) and/or the DCI format(s), information used for indicating the activation, the deactivation, and/or the switching of the one or more serving cells. Namely, the UE 102 may activate, based on the information used for indicating the activation and/or the switching of the serving cell(s) (e.g., the secondary cell(s)), the serving cell(s) (e.g., the secondary cell(s)).

And, in a case that the serving cell(s) is activated, the UE 102 may perform the SRS transmission (e.g., the aperiodic SRS transmission) on the serving cell(s). Also, in a case that the serving cell(s) is activated, the UE 102 may perform CSI reporting (e.g., the aperiodic CSI reporting) for the serving cell(s). Also, in a case that the serving cell(s) is activated, the UE 102 may perform the PDCCH monitoring on the serving cell(s). Also, in a case that the serving cell(s) is activated, the UE 102 may perform the PDCCH monitoring for the serving cell(s). Also, the UE 102 may deactivate, based on the information used for deactivating the serving cell(s) (e.g., the secondary cell(s)), the serving cell(s) (e.g., the secondary cell(s)).

Also, in a case that the serving cell(s) is deactivated, the UE 102 may not perform the SRS transmission (e.g., the aperiodic SRS transmission) on the serving cell(s). Also, in a case that the serving cell(s) is deactivated, the UE 102 may not perform the CSI reporting (e.g., the aperiodic CSI reporting) for the serving cell(s). Also, in a case that the serving cell(s) is deactivated, the UE 102 may not transmit UL-SCH on the serving cell(s). Also, in a case that the serving cell(s) is deactivated, the UE 102 may not monitor the PDCCH on the serving cell(s). Also, in a case that the serving cell(s) is deactivated, the UE 102 may not monitor the PDCCH for the serving cell(s).

Also, the gNB 160 may transmit, by using the PBCH (e.g., the MIB), the PDSCH (e.g., the SIB type 2), and/or the RRC message (e.g., the dedicated RRC message), information used for configuring an index of the scheduling cell (e.g., a scheduling serving cell, a scheduling cell ID). Here, the index of the scheduling cell may be used for indicating that which serving cell(s) signals the DCI format(s) for the downlink (i.e., the downlink assignment(s)) and/or the DCI format(s) for the uplink (i.e., the uplink grant(s)), for the concerned serving cell (e.g., for the concerned secondary cell). Namely, the information used for indicating the index of the scheduling cell may be used for indicating the serving cell (e.g., the serving cell in which the DCI format(s) for the downlink is transmitted). And, the DCI format(s) for the downlink transmitted in the serving cell indicated by the information used for indicating the index of the scheduling cell, may be used for scheduling of the PDSCH in the other serving cell (e.g., the serving cell in which the PDSCH is scheduled). Also, the information used for indicating the index of the scheduling cell may be used for indicating the serving cell (e.g., the serving cell in which the DCI format(s) for the uplink is transmitted). And, the DCI format(s) for the uplink transmitted in the serving cell indicated by the information used for indicating the index of the scheduling cell, may be used for scheduling of the PUSCH in the other serving cell (e.g., the serving cell in which the PUSCH is scheduled). Namely, the scheduling cell may be corresponding to the serving cell scheduling the PDSCH and/or the PUSCH. Also, the scheduled cell (e.g., the scheduled serving cell) may be corresponding to the serving cell in which the PDSCH and/or the PUSCH is scheduled.

Here, a mapping (e.g., a link (e.g., linking, a pairing, a correspondence)) of the scheduling cell and the scheduled cell may be one-to-one mapping. Namely, one scheduling cell (e.g., one index of scheduling cell) may be configured for one scheduled cell. Namely, multiple scheduling cell (e.g., multiple indices of scheduling cells) may not be configured for one scheduled cell. Also, the index of the scheduling cell may be configured by using the serving cell index. As described above, the serving cell index of the primary cell may be "0". Also, the serving cell index of the secondary cell(s) may be corresponding to the secondary cell index (e.g., the secondary cell index configured by the gNB 160).

Also, in a case that the carrier indicator field(s) is not configured in the DCI format(s) for the downlink and/or the uplink, the UE 102 may not monitor the DCI format(s) for the downlink and/or the uplink, without the carrier indicator field(s). Also, in a case that the carrier indicator field(s) is configured in the DCI format(s) for the downlink and/or the uplink, the UE 102 may monitor the DCI format(s) for the downlink and/or the uplink, with the carrier indicator field(s). And, the UE 102 may perform, based on a value(s) of the carrier indicator field(s), reception on the PDSCH and/or transmission on the PUSCH (and/or the PUCCH). For example, for the serving cell(s) on which the UE 102 monitors the PDCCH candidates in the USS, if the carrier indicator field(s) is not configured in the DCI format(s) for the downlink and/or the uplink) the UE 102 may monitor the PDCCH candidates without the carrier indicator field(s). Also, for the serving cell(s) on which the UE 102 monitors the PDCCH candidates in the USS, if the carrier indicator field(s) is configured in the DCI format(s) for the downlink and/or the uplink, the UE 102 may monitor the PDCCH candidates with the carrier indicator field(s).

As one example, the primary cell (e.g., the serving cell index "0"), the secondary cell 1 (e.g., the serving cell index "1"), and the secondary cell 2 (e.g., the serving cell index "2") may be configured. Also, for the secondary cell 1 (e.g., the serving cell index "1"), the gNB 160 may configure the serving cell index "0" (i.e., the primary cell) as the index of the scheduling cell. Also, for the secondary cell 2 (e.g., the serving cell index "2"), the gNB 160 may configure the serving cell index "2" (i.e., the secondary cell 2) as the index of the scheduling cell. Here, as described above, the primary cell may be always scheduled by using the DCI format(s) on the primary cell (i.e., via its PDCCH).

Namely, for example, the PDSCH on the primary cell may be scheduled by using the DCI format(s) for the downlink on the primary cell. Also, the PDSCH on the secondary cell 1 (e.g., the serving cell index "1") may be scheduled by using the DCI format(s) for the downlink on the primary cell (e.g., the serving cell index "0"). Also, the PDSCH on the secondary cell 2 (e.g., the serving cell index "2") may be scheduled by using the DCI format(s) for the downlink on the secondary cell 2 (e.g., the serving cell index "2"). Namely, the PDSCH on the primary cell (e.g., the serving cell index "0" (i.e., "000")) and the PDSCH on the secondary cell 1 (e.g., the serving cell index "1" (i.e., 001)) may be scheduled by using the DCI format(s) for the downlink on the primary cell. And, in a case that the DCI format(s) for the downlink is received and the carrier indicator field(s) indicates a value of "000", the UE 102 may recognize the PDSCH on the primary cell (e.g., the serving cell index "0" (i.e., "000")) is scheduled. And, the UE 102 may perform the reception on the PDSCH on the primary cell (e.g., the serving cell index "0" (i.e., "000")). Also, in a case that the DCI format(s) for the downlink is received and the carrier indicator field(s) indicates a value of "001", the UE 102 may recognize the PDSCH on the secondary cell 1 (e.g., the serving cell index "1" (i.e., "001")) is scheduled. And, the UE 102 may perform the reception on the PDSCH on the secondary cell 1 (e.g., the serving cell index "1" (i.e., "001")).

Also, for example, the PUSCH on the primary cell may be scheduled by using the DCI format(s) for the uplink on the primary cell. Also, the PUSCH on the secondary cell 1 (e.g., the serving cell index "1") may be scheduled by using the DCI format(s) for the uplink on the primary cell (e.g., the serving cell index "0"). Also, the PUSCH on the secondary cell 2 (e.g., the serving cell index "2") may be scheduled by using the DCI format(s) for the uplink on the secondary cell 2 (e.g., the serving cell index "2"). Namely, the PUSCH on the primary cell (e.g., the serving cell index "0" (i.e., "000")) and the PUSCH on the secondary cell 1 (e.g., the serving cell index "1" (i.e., 001)) may be scheduled by using the DCI format(s) for the uplink on the primary cell. And, in a case that the DCI format(s) for the uplink is received and the carrier indicator field(s) indicates a value of "000", the UE 102 may recognize the PUSCH on the primary cell (e.g., the serving cell index "0" (i.e., "000")) is scheduled. And, the UE 102 may perform the transmission on the PUSCH on the primary cell (e.g., the serving cell index "0" (i.e., "000")). Also, in a case that the DCI format(s) for the uplink is received and the carrier indicator field(s) indicates a value of "001", the UE 102 may recognize the PUSCH on the secondary cell 1 (e.g., the serving cell index "1" (i.e., "001")) is scheduled. And, the UE 102 may perform the transmission on the PUSCH on the secondary cell 1 (e.g., the serving cell index "1" (i.e., "001")).

Also, for example, one or more BWPs (e.g., at most four DL BWPs and/or at most four UL BWPs) may be configured to the UE 102. Here, the configured one or more serving cells may include one or more initial active BWPs (e.g., the initial active DL BWPs, and/or the initial active UL BWPs). Also, the configured one or more serving sells may include one or more default BWPs (e.g., the default DL BWPs, and/or the default UL BWPs). Also, the configured one or more serving sells may include one or more active BWPs (e.g., the active DL BWPs, and/or the active UL BWPs). For example, the initial active BWP(s) may be a BWP(s) (e.g., the DL BWP(s) and/or the UL BWP(s)) on which the initial connection establishment procedure (e.g., the random access procedure, as described above) is performed. Also, the initial active BWP(s) may be a BWP (e.g., the DL BWP(s) and/or the UL BWP(s)) on which the connection re-establishment procedure is performed. Also, the initial active BWP(s) may be a BWP (e.g., the DL BWP(s) and/or the UL BWP(s)) that is indicated as the initial active BWP (e.g., indicated as the initial active BWP(s) during the handover procedure). Namely, the gNB 160 may transmit a handover command including information used for indicating the initial active BWP(s) (e.g., the initial active DL BWP(s) and/or the initial active UL BWP(s)).

Also, for example, the default BWP(s) may be a BWP(s) (e.g., the DL BWP(s) and/or the UL BWP(s)) on which the initial connection establishment procedure (e.g., the random access procedure, as described above) is performed. Also, the default BWP(s) may be a BWP(s) (e.g., the DL BWP(s) and/or the UL BWP(s)) on which the connection re-establishment procedure is performed. Also, the default BWP(s) may be a BWP(s) (e.g., the DL BWP(s) and/or the UL BWP(s)) that is indicated as the default BWP(s) (e.g., indicated as the default BWP(s) during the handover procedure). Namely, the gNB 160 may transmit the handover command including information used for indicating the default BWP(s) (e.g., the default DL BWP(s) and/or the default UL BWP(s)).

Here, as described above, the gNB 160 may independently configure the initial active DL BWP(s) and the initial active UL BWP(s). Also, the gNB 160 may independently configure the default DL BWP(s) and the default UL BWP(s). Also, the gNB 160 may independently configure, in the serving cell, the one or more DL BWPs (e.g., at most four DL BWPs) and the one or more UL BWPs (e.g., at most four UL BWPs).

Here, the initial active BWP(s) (e.g., if the default BWP(s) is not configured) and/or the default BWP(s) (e.g., if the default BWP(s) is configured) may be used for transmitting on the PUCCH. Namely, the UE 102 may perform the transmission on the PUCCH in the initial active BWP (e.g., if the default BWP(s) is not configured) and/or the default BWP (e.g., if the default BWP(s) is configured). Also, the initial active BWP(s) and/or the default BWP(s) may not be deactivated. Also, a cross-BWP scheduling may not be applied to the initial active BWP(s) and/or the default BWP(s). For example, the initial active DL BWP(s) (e.g., the PDSCH on the initial active DL BWP(s)) may be scheduled via its PDCCH (e.g., the PDCCH on the initial active DL BWP(s), the DCI format(s) transmitted on the initial active DL BWP(s)). Also, the initial active UL BWP(s) (e.g., the PUSCH on the initial active UL BWP(s)) may be scheduled via the PDCCH on the initial active DL BWP(s) (e.g., the DCI format(s) transmitted on the initial active DL BWP(s)). Here, the initial active DL BWP(s) (e.g., the PDSCH on the initial active DL BWP(s)) may be scheduled via the PDCCH on the active DL BWP(s) (e.g., the DCI format(s) transmitted on the active DL BWP(s)). Also, the initial active UL BWP(s) (e.g., the PUSCH on the initial active UL BWP(s)) may be scheduled via the PDCCH on the default DL BWP(s) (e.g., the DCI format(s) transmitted on the default DL BWP(s)). Here, the initial active UL BWP(s) (e.g., the PUSCH on the initial active UL BWP(s)) may be scheduled via the PDCCH on the active DL BWP(s) (e.g., the DCI format(s) transmitted on the active DL BWP(s)).

Also, the default DL BWP(s) (e.g., the PDSCH on the default DL BWP(s)) may be scheduled via its PDCCH (e.g., the PDCCH on the default DL BWP(s), the DCI format(s) transmitted on the default DL BWP(s)). Also, the default UL BWP(s) (e.g., the PUSCH on the default UL BWP(s)) may be scheduled via the PDCCH on the default DL BWP(s) (e.g., the DCI format(s) transmitted on the default DL BWP(s)). Here, the default DL BWP(s) (e.g., the PDSCH on the default DL BWP(s)) may be scheduled via the PDCCH on the active DL BWP(s) (e.g., the DCI format(s) transmitted on the active DL BWP(s)). Also, the default UL BWP(s) (e.g., the PUSCH on the default UL BWP(s)) may be scheduled via the PDCCH on the default DL BWP(s) (e.g., the DCI format(s) transmitted on the default DL BWP(s)). Here, the default UL BWP(s) (e.g., the PUSCH on the default UL BWP(s)) may be scheduled via the PDCCH on the active DL BWP(s) (e.g., the DCI format(s) transmitted on the active DL BWP(s)).

Also, in a case that the PDCCH (e.g., the PDCCH CORESET(s), and/or the PDCCH monitoring occasion(s)) of the DL BWP(s) is configured, the cross-BWP scheduling may not be applied to the BWP(s). Namely, in a case that the PDCCH of the DL BWP(s) is configured, the BWP(s) (e.g., the DL BWP(s) and/or the UL BWP(s)) may be always scheduled via its PDCCH (i.e., the PDCCH of the BWP(s)). Also, in a case that the PDCCH (e.g., the CORESET(s), and/or the PDCCH monitoring occasion(s)) of the DL BWP(s) is not configured, the cross-BWP scheduling may be applied to the BWP(s) (e.g., the DL BWP(s) and/or the UL BWP(s)). Namely, in a case that the PDCCH of the DL BWP(s) is not configured, the BWP(s) (e.g., the DL BWP(s) and/or the UL BWP(s)) may be scheduled via the PDCCH of other BWP(s). Namely, in a case that the PDCCH is configured for the DL BWP(s), the DL BWP(s) (e.g., the PDSCH on the DL BWP(s)) may be always scheduled by its PDCCH (e.g., the DCI format(s) transmitted on the DL BWP(s)). Also, in a case that the PDCCH is not configured for the DL BWP(s), the DL BWP(s) (e.g., the PDSCH on the DL BWP(s)) may be scheduled via the PDCCH on the other DL BWP(s) (e.g., the DCI format(s) transmitted on the other DL BWP(s)). Also, in a case that the PDCCH is configured for the DL BWP(s) linked to the UL BWP(s), the UL BWP(s) (e.g., the PUSCH on the UL BWP(s)) may be always scheduled by the PDCCH on the DL BWP(s) linked to the UL BWP(s) (e.g., the DCI format(s) transmitted on the DL BWP(s) linked to the UL BWP(s)). Also, in a case that the PDCCH is not configured for the DL BWP(s) linked to the UL BWP(s), the UL BWP(s) (e.g., the PUSCH on the UL BWP(s)) may be scheduled via the PDCCH on the other DL BWP(s) linked to the UL BWP(s) (e.g., the DCI format(s) transmitted on the other DL BWP(s)). Here, as described above, the BWP indicator (i.e., the BWP indicator field(s)) may be included in the DCI format(s) for indicating the BWP(s) (e.g., the BWP(s) on which the corresponding PDSCH and/or the corresponding PUSCH is scheduled).

Also, the DL BWP(s) (e.g., the PDSCH on the DL BWP(s)) may be scheduled via its PDCCH (e.g., the DCI format(s) transmitted on the DL BWP(s)) and the other PDCCH (e.g., the DCI format(s) transmitted on the other DL BWP(s)). For example, an initial transmission on the PDSCH on the DL BWP(s) may be scheduled via its PDCCH (e.g., the DCI format(s) transmitted on the DL BWP(s)), and a retransmission (e.g., a retransmission of the same TB) on the PDSCH on the DL BWP(s) may be scheduled via the other PDCCH (e.g., the DCI format(s) transmitted on the other DL BWP(s)). Also, the initial transmission on the PDSCH may be scheduled (e.g., scheduled via the PDCCH on the DL BWP(s) (e.g., the DCI format(s) transmitted on the DL BWP(s), and/or scheduled via the PDCCH on the other DL BWP(s) (e.g., the DCI format(s) transmitted on the other DL BWP(s)) on the DL BWP(s), and the retransmission on the PDSCH may be scheduled (e.g., scheduled via the PDCCH on the DL BWP(s) (e.g., the DCI format(s) transmitted on the DL BWP(s), and/or scheduled via the PDCCH on the other DL BWP(s) (e.g., the DCI format(s) transmitted on the other DL BWP(s))) on the other DL BWP(s).

Also, the UL BWP(s) (e.g., the PUSCH on the UL BWP(s)) may be scheduled via the PDCCH (e.g., the DCI format(s) transmitted on the DL BWP(s) linked to the UL BWP(s)) and the other PDCCH (e.g., the DCI format(s) transmitted on the other DL BWP(s) linked to the UL BWP(s)). For example, an initial transmission on the PUSCH on the UL BWP(s) may be scheduled via the PDCCH (e.g., the DCI format(s) transmitted on the DL BWP(s) linked to the UL BWP(s)), and a retransmission (e.g., a retransmission of the same TB) on the PUSCH on the UL BWP(s) may be scheduled via the other PDCCH (e.g., the DCI format(s) transmitted on the other DL BWP(s) linked to the UL BWP(s)). Also, the initial transmission on the PUSCH may be scheduled (e.g., scheduled via the PDCCH on the DL BWP(s) (e.g., the DCI format(s) transmitted on the DL BWP(s) linked to the UL BWP(s)), and/or scheduled via the PDCCH on the other DL BWP(s) (e.g., the DCI format(s) transmitted on the other DL BWP(s) linked to the UL BWP(s)) on the UL BWP(s), and the retransmission on the PUSCH may be scheduled (e.g., scheduled via the PDCCH on the DL BWP(s) (e.g., the DCI format(s) transmitted on the DL BWP(s) linked to the UL BWP(s), and/or scheduled via the PDCCH on the other DL BWP(s) (e.g., the DCI format(s) transmitted on the other DL BWP(s) linked to the UL BWP(s)) on the other UL BWP(s). Namely, there may be one HARQ entity (e.g., one HARQ entity in the MAC layer) per serving cell, even if there are multiple BWPs configured for the serving cell. Namely, the HARQ entity per serving cell may manage the initial transmission and/or the retransmission across the BWP(s) (e.g., the DL BWP(s) and/or the UL BWP(s)) in the serving cell. Here, the initial transmission on the PDSCH and the retransmission on the PDSCH ma be performed within the serving cell. Also, the initial transmission on the PUSCH and the retransmission on the PUSCH may be performed within the serving cell.

Also, as described above, the link (i.e., the linking, the pairing, and/or the correspondence) may be defined between the UL BWP(s) and the DL BWP(s). Namely, a BWP(s) in which the transmission on the PDSCH is performed based on the scheduling by using the DCI format(s) (i.e., the DCI format(s) for the downlink (i.e., the downlink assignment)) may be identified based on the link. Also, a BWP(s) in which the transmission on the PUSCH is performed based on the scheduling by using the DCI format(s) (i.e., the DCI format(s) for the uplink (i.e., the uplink grant)) may be identified based on the link. Here, in this case, the BWP indicator field(s) may not be included in the DCI format(s) (i.e., the DCI format(s) for the downlink, the DCI format(s) for the uplink). Namely, the DCI format(s) received on the DL BWP(s) may be corresponding to the downlink transmission (e.g., the PDSCH transmission) on the DL BWP(s). Also, the DCI format(s) received on the BWP(s) may be corresponding to the uplink transmission (e.g., the PUSCH transmission) on the BWP(s).

Here, an activation, a deactivation, and/or a switching mechanism of the BWP(s) (e.g., the DL BWP(s) and/or the UL BWP(s)) may be supported. For example, the activation, the deactivation, and/or the switching of the BWP(s) may be controlled (e.g., configured, and/or indicated) by using the higher layer signal (e.g., the RRC message (e.g., the dedicated RRC message), and/or the MAC CE) and/or the DCI format(s) (e.g., the PDCCH indicating the downlink assignment, and/or the PDCCH indicating the uplink grant). For example, the gNB 160 may transmit, e.g., by using the higher layer signal and/or the DCI format(s), information used for indicating the activation, the deactivation, and/or the switching of the BWP(s). Namely, the gNB 160 may transmit, e.g., by using the higher layer signal and/or the DCI format(s), information used for indicating the activation of the BWP(s). And, the UE 102 may activate the BWP(s) based on the information used for indicating the activation of the BWP(s). Also, the gNB 160 may transmit, e.g., by using the higher layer signal and/or the DCI format(s), information used for indicating the deactivation of the BWP(s). And, the UE 102 may deactivate the BWP(s) based on the information used for indicating the deactivation of the BWP(s). Also, the gNB 160 may transmit, e.g., by using the higher layer signal and/or the DCI format(s), information used for indicating the switching of the BWP(s). And, the UE 102 may switch the BWP(s) based on the information used for indicating the switching of the BWP(s). Here, for example, the switching of the BWP(s) (e.g., the switching of the BWP(s) for the serving cell(s)) may be used for activating an in active BWP(s) and deactivating BWP(s) at a time.

Here, the initial active BWP(s) (e.g., the initial activate DL BWP(s) and/or the initial active UL BWP(s)) may be always activated. Also, if the default BWP(s) (e.g., the default DL BWP(s) and/or the default UL BWP(s)) is configured, the default BWP may be always activated. Namely, the initial active BWP(s) and/or the default BWP(s) may be active without the information used for indicating the activation, the deactivation, and/or the switching of the BWP(s). Also, as described above, a serving cell may be configured with at most four BWP(s) (e.g., at most four DL BWP(s) and/or at most four UL BWP(s)), and for an activated serving cell, there may always one active BWP (e.g., one active DL BWP and/or one active UL BWP) at any point in time.

Here, in a case that the BWP(s) is activated (i.e., on the active BWP(s) for each activated serving cell configured with the BWP(s) (e.g., the BWP operation)), the UE 102 may perform transmission on the UL-SCH (i.e., transmission on the UL-SCH on the BWP(s)). Also, in a case that the BWP(s) is activated, the UE 102 may perform transmission on RACH (i.e., transmission on the RACH on the BWP(s)). Also, in a case that the BWP(s) is activated, the UE 102 may monitor the PDCCH (i.e., perform the PDCCH monitoring on the BWP(s). Also, in a case that the BWP(s) is activated, the UE 102 may perform transmission on the PUCCH (i.e., transmission on the PUCCH on the BWP(s)). Also, in a case that the BWP(s) is activated, the UE 102 may perform reception on the DL-SCH (i.e., reception on the DL-SCH on the BWP(s)).

Also, in a case that the BWP(s) is deactivated (i.e., on the inactive BWP(s) for each activated serving cell configured with the BWP(s) (e.g., the BWP operation)), the UE 102 may not perform transmission on the UL-SCH (i.e., transmission on the UL-SCH on the BWP(s)). Also, in a case that the BWP(s) is deactivated, the UE 102 may not perform transmission on RACH (i.e., transmission on the RACH on the BWP(s)). Also, in a case that the BWP(s) is deactivated, the UE 102 may not monitor the PDCCH (i.e., perform the PDCCH monitoring on the BWP(s). Also, in a case that the BWP(s) is deactivated, the UE 102 may not perform transmission on the PUCCH (i.e., transmission on the PUCCH on the BWP(s)). Also, in a case that the BWP(s) is deactivated, the UE 102 may not perform reception on the DL-SCH (i.e., reception on the DL-SCH on the BWP(s)).

Figure 6:
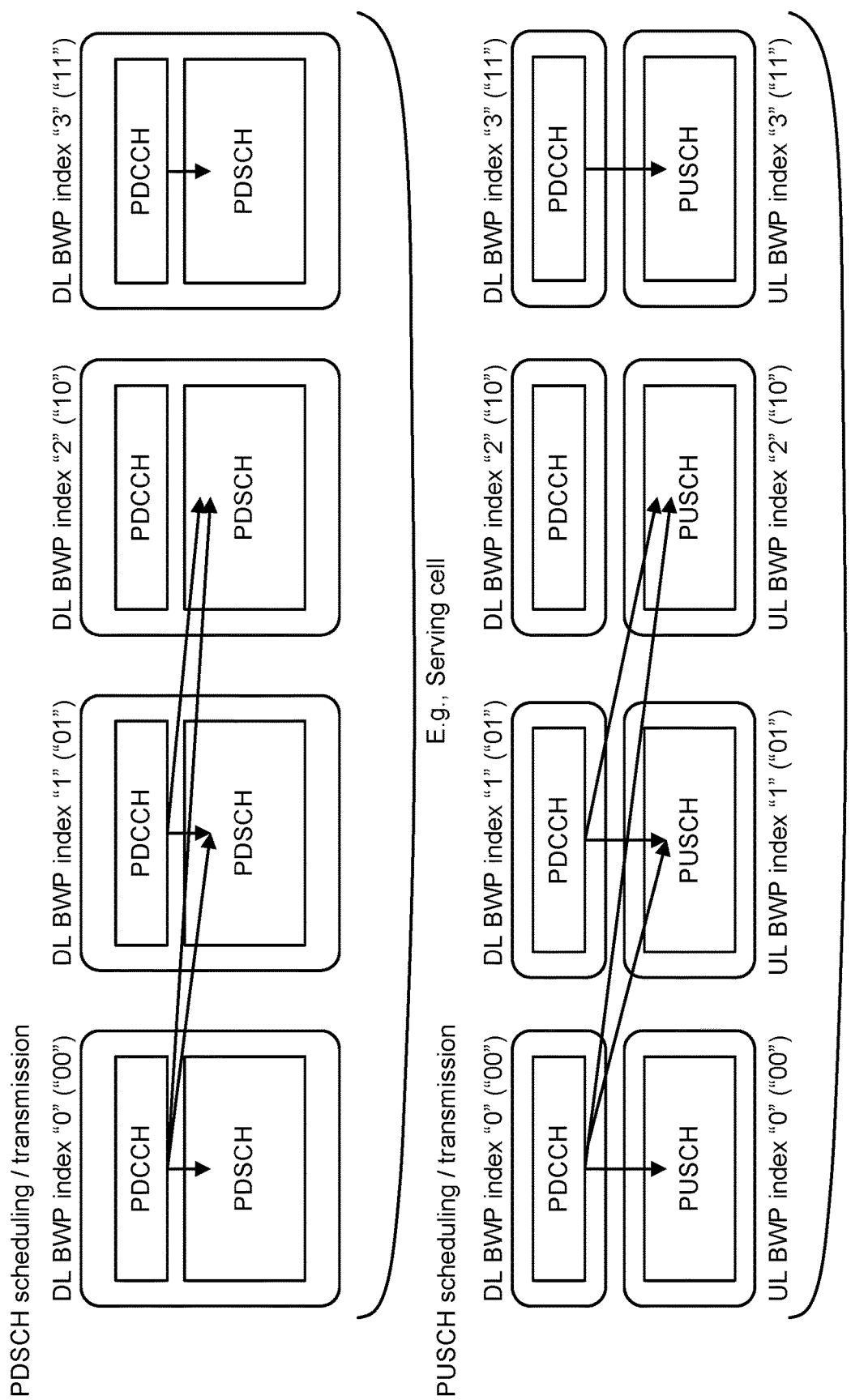
FIG. 6 illustrates another example of the downlink and/or uplink transmissions.

FIG. 6 illustrates another example of the downlink and/or uplink transmissions. Here, as described above, the gNB 160 may transmit, by using the PBCH (e.g., the MIB), the PDSCH (e.g., the SIB type 2), and/or the RRC message (e.g., the dedicated RRC message), information used for specifying (e.g., configuring) configuration(s) in a case that the BWP(s) operation is used in the serving cell(s) (e.g., in a case that the BWP(s) (e.g., the DL BWP(s) and/or the UL BWP(s)) is configured for the serving cell(s)). Also, for example, as described above, the gNB 160 may transmit, by using the PBCH (e.g., the MIB), the PDSCH (e.g., the SIB type 2), and/or the RRC message (e.g., the dedicated RRC message), second information used for configuring whether the BWP indicator field(s) is present or not in the DCI format(s).

Also, the gNB 160 may transmit, by using the PBCH (e.g., the MIB), the PDSCH (e.g., the SIB type 2), and/or the RRC message (e.g., the dedicated RRC message), information (e.g., third information) used for configuring an index of the scheduled BWP(s) (e.g., the index of the BWP(s) (e.g., the index of the DL BWP(s) and/or the index of the UL BWP(s)). Here, the third information may be used for indicating that which BWP(s) (e.g., the DL BWP(s) and/or the UL BWP(s)) is scheduled by using the DCI format(s) for the downlink (i.e., the downlink assignment(s)) and/or the DCI format(s) for the uplink (i.e., the uplink grant(s)), for the concerned BWP(s). Namely, the third information may be used for indicating the BWP(s) (e.g., the DL BWP(s) and/or the UL BWP(s)) (e.g., the DL BWP(s) scheduled by using the DCI format(s) for the downlink, and/or the UL BWP(s) scheduled by using the DCI format(s) for the uplink). And, the DCI format(s) for the downlink in the other DL BWP(s) may be used for scheduling of the PDSCH in the BWP(s) indicated by the third information. Namely, the PDSCH in the BWP(s) indicated by the third information, may be scheduled by using the DCI format(s) for the downlink in the other DL BWP. Also, the DCI format(s) for the uplink in the other DL BWP(s) may be used for scheduling of the PUSCH in the BWP(s) indicated by the third information. Namely, the PUSCH in the BWP(s) indicated by the third information, may be scheduled by using the DCI format(s) for the uplink in the other DL BWP. Namely, the scheduled BWP(s) may be corresponding to the BWP(s) in which the PDSCH and/or the PUSCH is scheduled. Also, the scheduling BWP(s) may be corresponding to the BWP(s) scheduling the PDSCH and/or the PUSCH (e.g. the BWP(s) in which the DCI format(s) for the downlink and/or the DCI format(s) for the uplink is transmitted).

Here, the third information may be configured per serving cell. Namely, the third information may be configured for each of the serving cells (e.g., each of the primary cell and the one or more secondary cells). Also, the third information may be configured per BWP (e.g., per BWP in the serving cell(s)). Namely, the third information may be configured for each of the BWPs (e.g., each of the DL BWP(s) and/or each of the UL BWP(s)). Also, the third information may be configured per DCI format. For example, the third information may be configured for each of the DCI formats (e.g., the DCI format A, the DCI format C, the DCI format D, and/or the DCI format F). Also, the third information may be configured for each of the DCI format(s) for the downlink (e.g., the DCI format A, and/or the DCI format C) and the DCI format(s) for the uplink (e.g., the DCI format D, and/or the DCI format F). Also, the third information may be configured for each of the PDSCH and the PUSCH. Namely, the third information may be configured for each of the downlink and the uplink.

Here, a mapping (e.g., a link (e.g., linking, a pairing, a correspondence)) of the scheduled BWP(s) and the scheduling BWP(s) may be many-to-one mapping (e.g., or many-to-many mapping). Namely, one or more scheduled BWPs (e.g., one or more indices of the BWPs (e.g., one or more indices of the DL BWPs, and/or one or more indices of the UL BWPs)) may be configured for one scheduling BWP (e.g., or one or more scheduling BWPs). Namely, multiple scheduled BWPs (e.g., multiple indices of the one or more scheduled BWPs) may be configured for one scheduling BWP (e.g., or multiple scheduling BWPs). For example, one scheduled BWP among the multiple scheduled BWPs may be used for the initial transmission on the PDSCH, and other scheduled BWP among the multiple scheduling BWPs may be used for the retransmission on the PDSCH. Also, one scheduled BWP among the multiple scheduling BWPs may be used for the initial transmission on the PUSCH, and other scheduled BWP among the multiple scheduling BWPs may be used for the retransmission on the PUSCH.

Also, a mapping (e.g., a link (e.g., linking, a pairing, a correspondence)) of the scheduled BWP(s) and the scheduling BWP(s) may be one-to-one mapping (e.g., or one-to-many mapping). Namely, one scheduled BWP (e.g., one index of the BWP (e.g., one index of the DL BWP, and/or one index of the UL BWP)) may be configured for one scheduling BWP (e.g., or one or more scheduling BWPs). Namely, multiple scheduled BWPs (e.g., multiple indices of the scheduling BWPs) may not be configured for one scheduling BWP (e.g., or one or more scheduling BWPs).

Here, the index of the scheduled BWP may be configured by using the index of the BWP(s). As described above, if the default BWP(s) (e.g., the default DL BWP(s) and/or the default UL BWP(s)) is not configured, the index of the initial active BWP(s) (e.g., the index of the initial active DL BWP(s) and/or the initial active UL BWP(s)) may be "0". Also, if the default BWP(s) (e.g., the default DL BWP(s) and/or the default UL BWP(s)) is configured, the index of the default BWP(s) (e.g., the index of the default DL BWP(s) and/or the default UL BWP(s)) may be "0". Also, the index of the secondary BWP(s) (e.g., the secondary DL BWP(s) and/or the secondary UL BWP(s)) may be corresponding to the index of the BWP(s) (e.g., the index of the BWP(s) (e.g., the DL BWP(s) and/or the UL BWP(s)) configured by the gNB 160). Also, the mapping between the scheduled BWP(s) and the scheduling BWP(s) may be depend on the subcarrier spacing. For example, the mapping between the scheduled BWP(s) and the scheduling BWP(s) may be applied for only the same subcarrier spacing.

Namely, the scheduled BWP(s) with a subcarrier spacing "A" may be mapped to only the scheduling BWP(s) with the subcarrier spacing "A". Also, the multiple scheduled BWPs may be BWPs with the same subcarrier spacing "A".

Here, as one example, the first BWP (e.g., the first DL BWP and/or the first UL BWP, the index of the BWP "0" (e.g., the initial active BWP and/or the default BWP)), the second BWP (e.g., the second DL BWP and/or the second UL BWP, the index of the BWP "1"), the third BWP (e.g., the third DL BWP and/or the third UL BWP, the index of the BWP "2"), and the fourth BWP (e.g., the fourth DL BWP and/or the fourth UL BWP, the index of the BWP "3") may be configured. Namely, as described in FIG. 6, the first BWP (e.g., the first DL BWP and/or the first UL BWP, the index of the DL BWP "0" and/or the index of the UL BWP "0" (e.g., initial active BWP and/or the default BWP)), the second BWP (e.g., the second DL BWP and/or the second UL BWP, the index of the DL BWP "1" and/or the index of the UL BWP "1"), the third BWP (e.g., the third DL BWP and/or the third UL BWP, the index of the DL BWP "2" and/or the index of the UL BWP "2"), and the fourth BWP (e.g., the fourth DL BWP and/or the fourth UL BWP, the index of the DL BWP "3" and/or the index of the UL BWP "3") may be configured.

And, for the first BWP (e.g., the index of the BWP "0") (e.g., the concerned BWP(s)), the gNB 160 may configure the index of the BWP "0" and the index of the BWP "1" and the index of the BWP "2" as the index of the scheduled BWP. Namely, the gNB 160 may configure more than one indices of the BWPs as the index of the scheduled BWP. Also, for the second BWP (e.g., the index of the BWP "1") (e.g., the concerned BWP(s)), the gNB 160 may configure the index of the BWP "1" and the index of the BWP "2" as the index of the scheduled BWP. Namely, the gNB 160 may configure more than one indices of the BWPs as the index of the scheduled BWP. Also, for the fourth BWP (e.g., the index of the BWP "3") (e.g., the concerned BWP(s)), the gNB 160 may configure the index of the BWP "3" as the index of the scheduled BWP. Namely, the gNB 160 may configure one index of the BWP as the index of the scheduling BWP. Here, as described above, the initial active BWP(s) and/or the default BWP(s) may be always scheduled by using the DCI format(s) for the downlink the initial active BWP(s) and/or the default BWP(s) (i.e., via its PDCCH).

Namely, the PDSCH in the first BWP (e.g., the index of the BWP "0") may be scheduled by using the DCI format(s) for the downlink in the first BWP (e.g., the index of the BWP "0"). Also, the PDSCH in the second BWP (e.g., the index of the BWP "1") may be scheduled by using the DCI format(s) for the downlink in the first BWP (e.g., the index of the BWP "0") and/or the second BWP (e.g., the index of the BWP "1"). Also, the PDSCH in the third BWP (e.g., the index of the BWP "2") may be scheduled by using the DCI format(s) for the downlink in the first BWP (e.g., the index of the BWP "0") and/or the second BWP (e.g., the index of the BWP "1"). And, the PDSCH in the fourth BWP (e.g., the index of the BWP "3") may be scheduled by using the DCI format(s) for the downlink in the fourth BWP (e.g., the index of the BWP "3").

Namely, the PDSCH in the first BWP (e.g., the index of the BWP "0" (i.e., "00")) and the PDSCH in the second BWP (e.g., the index of the BWP "1" (i.e., 01)) and the PDSCH in the third BWP (e.g., the index of the BWP "2" (i.e., 10)) may be scheduled by using the DCI format(s) for the downlink in the first BWP. And, in a case that the DCI format(s) for the downlink is received and the BWP indicator field(s) indicates a value of "00", the UE 102 may recognize the PDSCH in the first BWP (e.g., the index of the BWP "0" (i.e., "00")) is scheduled. And, the UE 102 may perform the reception on the PDSCH in the first BWP (e.g., the index of the BWP "0" (i.e., "00")). Also, in a case that the DCI format(s) for the downlink is received and the BWP indicator field(s) indicates a value of "01", the UE 102 may recognize the PDSCH in the second BWP (e.g., the index of the BWP "1" (i.e., "01")) is scheduled. And, the UE 102 may perform the reception on the PDSCH in the second BWP (e.g., the index of the BWP "1" (i.e., "01")). Also, in a case that the DCI format(s) for the downlink is received and the BWP indicator field(s) indicates a value of "10", the UE 102 may recognize the PDSCH in the third BWP (e.g., the index of the BWP "2" (i.e., "10")) is scheduled. And, the UE 102 may perform the reception on the PDSCH in the third BWP (e.g., the index of the BWP "2" (i.e., "10")).

Also, the PDSCH in the second BWP (e.g., the index of the BWP "1" (i.e., 01)) and the PDSCH in the third BWP (e.g., the index of the BWP "2" (i.e., 10)) may be scheduled by using the DCI format(s) for the downlink in the second BWP. And, in a case that the DCI format(s) for the downlink is received and the BWP indicator field(s) indicates a value of "01", the UE 102 may recognize the PDSCH in the second BWP (e.g., the index of the BWP "1" (i.e., "01")) is scheduled. And, the UE 102 may perform the reception on the PDSCH in the second BWP (e.g., the index of the BWP "1" (i.e., "01")). Also, in a case that the DCI format(s) for the downlink is received and the BWP indicator field(s) indicates a value of "10", the UE 102 may recognize the PDSCH in the third BWP (e.g., the index of the BWP "2" (i.e., "10")) is scheduled. And, the UE 102 may perform the reception on the PDSCH in the third BWP (e.g., the index of the BWP "2" (i.e., "10")). Namely, the UE 102 may not receive the DCI format including the BWP indicator field(s) set to "00". Namely, based on the information used for configuring the index of the scheduling BWP(s), the UE 102 may determine (e.g., assume) the value(s) (e.g., the value(s) of "01" and "11") of the BWP indicator field(s) (e.g., the value(s) to which the BWP indicator field(s) is set). Also, based on the information used for configuring the index of the scheduling BWP(s), the UE 102 may determine (e.g., assume) the value(s) (e.g., the value(s) of "00") to which the BWP indicator field(s) is not set. Namely, based on the information used for configuring the index of the scheduling BWP(s), the UE 102 may not be expected to receive the value(s) to which the BWP indicator field(s) is not set.

Also, the PDSCH in the fourth BWP (e.g., the index of the BWP "3" (i.e., 11)) may be scheduled by using the DCI format(s) for the downlink in the fourth BWP. And, in a case that the DCI format(s) for the downlink is received and the BWP indicator field(s) indicates a value of "11", the UE 102 may recognize the PDSCH in the fourth BWP (e.g., the index of the BWP "3" (i.e., "11")) is scheduled. And, the UE 102 may perform the reception on the PDSCH in the fourth BWP (e.g., the index of the BWP "3" (i.e., "11")). Namely, the UE 102 may not receive the DCI format for the downlink including the BWP indicator field(s) set to "00", "01", and "10". Namely, based on the information used for configuring the index of the scheduling BWP(s), the UE 102 may determine (e.g., assume) the value(s) (e.g., the value(s) of "11") of the BWP indicator field(s) (e.g., the value(s) to which the BWP indicator field(s) is set). Also, based on the information used for configuring the index of the scheduling BWP(s), the UE 102 may determine (e.g., assume) the value(s) (e.g., the value(s) of "00", "01" and/or "10") to which the BWP indicator field(s) is not set. Namely, based on the information used for configuring the index of the scheduling BWP(s), the UE 102 may not be expected to receive the value(s) (e.g., the value(s) of "00", "01" and/or "10") to which the BWP indicator field(s) is not set.

Also, for example, the PUSCH in the first BWP (e.g., the index of the BWP "0") may be scheduled by using the DCI format(s) for the uplink in the first BWP (e.g., the index of the BWP "0"). Also, the PUSCH in the second BWP (e.g., the index of the BWP "1") may be scheduled by using the DCI format(s) for the uplink in the first BWP (e.g., the index of the BWP "0") and/or the second BWP (e.g., the index of the BWP "1"). Also, the PUSCH in the third BWP (e.g., the index of the BWP "2") may be scheduled by using the DCI format(s) for the uplink in the first BWP (e.g., the index of the BWP "0") and/or the second BWP (e.g., the index of the BWP "1"). Also, the PDSCH in the fourth BWP (e.g., the index of the BWP "3") may be scheduled by using the DCI format(s) for the uplink in the fourth BWP (e.g., the index of the BWP "3").

Namely, the PUSCH in the first BWP (e.g., the index of the BWP "0" (i.e., "00")) and the PUSCH in the second BWP (e.g., the index of the BWP "1" (i.e., 01)) and the PUSCH in the third BWP (e.g., the index of the BWP "2" (i.e., 10)) may be scheduled by using the DCI format(s) for the uplink in the first BWP. And, in a case that the DCI format(s) for the uplink is received and the BWP indicator field(s) indicates a value of "00", the UE 102 may recognize the PUSCH in the first BWP (e.g., the index of the BWP "0" (i.e., "00")) is scheduled. And, the UE 102 may perform the transmission on the PUSCH in the first BWP (e.g., the index of the BWP "0" (i.e., "00")). Also, in a case that the DCI format(s) for the uplink is received and the BWP indicator field(s) indicates a value of "01", the UE 102 may recognize the PUSCH in the second BWP (e.g., the index of the BWP "1" (i.e., "01")) is scheduled. And, the UE 102 may perform the transmission on the PUSCH in the second BWP (e.g., the index of the BWP "1" (i.e., "01")). Also, in a case that the DCI format(s) for the uplink is received and the BWP indicator field(s) indicates a value of "10", the UE 102 may recognize the PUSCH in the third BWP (e.g., the index of the BWP "2" (i.e., "10")) is scheduled. And, the UE 102 may perform the transmission on the PDSCH in the third BWP (e.g., the index of the BWP "2" (i.e., "10")).

Also, the PUSCH in the second BWP (e.g., the index of the BWP "1" (i.e., 01)) and the PUSCH in the third BWP (e.g., the index of the BWP "2" (i.e., 10)) may be scheduled by using the DCI format(s) for the uplink in the second BWP. And, in a case that the DCI format(s) for the uplink is received and the BWP indicator field(s) indicates a value of "01", the UE 102 may recognize the PUSCH in the second BWP (e.g., the index of the BWP "1" (i.e., "01")) is scheduled. And, the UE 102 may perform the transmission on the PUSCH in the second BWP (e.g., the index of the BWP "1" (i.e., "01")). Also, in a case that the DCI format(s) for the uplink is received and the BWP indicator field(s) indicates a value of "10", the UE 102 may recognize the PUSCH in the third BWP (e.g., the index of the BWP "2" (i.e., "10")) is scheduled. And, the UE 102 may perform the transmission on the PUSCH in the third BWP (e.g., the index of the BWP "2" (i.e., "10")). Namely, the UE 102 may not receive the DCI format(s) for the uplink including the BWP indicator field(s) set to "00" and/or "11". Namely, based on the information used for configuring the index of the scheduling BWP(s), the UE 102 may determine (e.g., assume) the value(s) (e.g., the value(s) of "01" and "10") of the BWP indicator field(s) (e.g., the value(s) to which the BWP indicator field(s) is set). Also, based on the information used for configuring the index of the scheduling BWP(s), the UE 102 may determine (e.g., assume) the value(s) (e.g., the value(s) of "00" and/or "11") to which the BWP indicator field(s) is not set. Namely, based on the information used for configuring the index of the scheduling BWP(s), the UE 102 may not be expected to receive the value(s) (e.g., the value(s) of "00" and/or "11") to which the BWP indicator field(s) is not set.

Also, the PUSCH in the fourth BWP (e.g., the index of the BWP "3" (i.e., 11)) may be scheduled by using the DCI format(s) for the uplink in the fourth BWP. And, in a case that the DCI format(s) for the uplink is received and the BWP indicator field(s) indicates a value of "11", the UE 102 may recognize the PUSCH in the fourth BWP (e.g., the index of the BWP "3" (i.e., "11")) is scheduled. And, the UE 102 may perform the transmission on the PUSCH in the fourth BWP (e.g., the index of the BWP "3" (i.e., "11")). Namely, the UE 102 may not receive the DCI format(s) for the uplink including the BWP indicator field(s) set to "00", "01", and "10". Namely, based on the information used for configuring the index of the scheduling BWP(s), the UE 102 may determine (e.g., assume) the value(s) (e.g., the value(s) of "11") of the BWP indicator field(s) (e.g., the value(s) to which the BWP indicator field(s) is set). Also, based on the information used for configuring the index of the scheduling BWP(s), the UE 102 may determine (e.g., assume) the value(s) (e.g., the value(s) of "00", "01" and/or "10") to which the BWP indicator field(s) is not set. Namely, based on the information used for configuring the index of the scheduling BWP(s), the UE 102 may not be expected to receive the value(s) (e.g., the value(s) of "00", "01" and/or "10") to which the BWP indicator field(s) is not set.

Here, the value(s) of the BWP indicator field(s) may be determined based on the number of the scheduled BWP(s) (e.g., the number of a candidate(s) of the scheduled BWP(s), the number of the BWP(s) that is possible to be scheduled). For example, the UE 102 may determine the number of the scheduled BWP(s) based on the third information. Also, the gNB 160 may transmit, by using the PBCH (e.g., the MIB), the PDSCH (e.g., the SIB type 2), and/or the RRC message (e.g., the dedicated RRC message), information (e.g., fourth information) used for configuring the number of the scheduled BWP(s).

Also, the gNB 160 may transmit, by using the PBCH (e.g., the MIB), the PDSCH (e.g., the SIB type 2), and/or the RRC message (e.g., the dedicated RRC message), information (e.g., fifth information) used for configuring a mapping (e.g., a link (e.g., a linking, a pairing, and/or a correspondence)) between the value(s) of the BWP indicator field(s) and the index of the scheduled BWP(s) (e.g., the index of the DL BWP(s) and/or the index of the UL BWP(s)). Here, the mapping between the value(s) of the BWP indicator field(s) and the index of the scheduled BWP(s) may be specified, in advance, by the specification, and known information between the gNB 160 and the UE 102.

For example, the gNB 160 may configure, as the mapping between the value(s) of the BWP indicator field(s) (e.g., 1-bit BWP indicator field(s)) and the index of the scheduled BWP(s), the value(s) "0" (e.g., "00") and the index of the BWP "2". Also, the gNB 160 may configure, as the mapping between the value(s) of the BWP indicator field(s) (e.g., 1-bit BWP indicator field(s)) and the index of the scheduled BWP(s), the value(s) "1" and the index of the BWP "1" (e.g., "01"). Also, the gNB 160 may configure, as the mapping between the value(s) of the BWP indicator field(s) (e.g., 2-bit BWP indicator field(s)) and the index of the scheduled BWP(s), the value(s) "00" and the index of the BWP "1" (e.g., "01"). Also, the gNB 160 may configure, as the mapping between the value(s) of the BWP indicator field(s) (e.g., 2-bit BWP indicator field(s)) and the index of the scheduled BWP(s), the value(s) "01" and the index of the BWP "2" (e.g., "10"). Also, the gNB 160 may configure, as the mapping between the value(s) of the BWP indicator field(s) (e.g., 2-bit BWP indicator field(s)) and the index of the scheduled BWP(s), the value(s) "10" and the index of the BWP "0" (e.g., "00"). Also, the gNB 160 may configure, as the mapping between the value(s) of the BWP indicator field(s) (e.g., 2-bit BWP indicator field(s)) and the index of the scheduled BWP(s), the value(s) "11" and the index of the BWP "3" (e.g., "11").

Here, for example, in a case that the self-BWP scheduling (i.e., the PUSCH in a certain BWP (e.g., the index of the BWP is c) is scheduled by using the DCI format(s) for the uplink in the certain BWP (e.g., the index of the BWP is c)), the value of "0" (e.g., for 1-bit BWP indicator field(s)) and/or "00" (e.g., for 2-bit BWP indicator field(s)) may be used (e.g., specified, defined, configured).

Also, the gNB 160 may transmit, by using the PBCH (e.g., the MIB), the PDSCH (e.g., the SIB type 2), and/or the RRC message (e.g., the dedicated RRC message), information (e.g., sixth information) used for configuring an index of the scheduling BWP(s) (e.g., the index of the BWP(s) (e.g., the index of the DL BWP(s)). Here, the sixth information may be used for indicating that which BWP(s) (e.g., the DL BWP(s)) signals the DCI format(s) for the downlink (i.e., the downlink assignment(s)) and/or the DCI format(s) for the uplink (i.e., the uplink grant(s)), for the concerned BWP(s). Namely, the sixth information may be used for indicating the BWP (e.g., the DL BWP(s)) (e.g., the BWP(s) in which the DCI format(s) for the downlink is transmitted). And, the DCI format(s) for the downlink transmitted in the DL BWP(s) indicated by the sixth information, may be used for scheduling of the PDSCH in the other BWP(s) (e.g., the BWP(s) in which the PDSCH is scheduled). Also, the sixth information may be used for indicating the BWP(s) (e.g., the DL BWP(s)) (e.g., the BWP(s) in which the DCI format(s) for the uplink is transmitted). And, the DCI format(s) for the uplink transmitted in the BWP(s) indicated by the sixth information, may be used for scheduling of the PUSCH in the other BWP(s) (e.g., the BWP(s) in which the PUSCH is scheduled).

Here, the sixth information may be configured per serving cell. Namely, the sixth information may be configured for each of the serving cells (e.g., each of the primary cell and the one or more secondary cells). Also, the sixth information may be configured per BWP (e.g., per BWP in the serving cell(s)). Namely, the sixth information may be configured for each of the BWPs (e.g., each of the DL BWP(s) and/or each of the UL BWP(s)). Also, the sixth information may be configured per DCI format. For example, the sixth information may be configured for each of the DCI formats (e.g., the DCI format A, the DCI format C, the DCI format D, and/or the DCI format F). Also, the sixth information may be configured for each of the DCI format(s) for the downlink (e.g., the DCI format A, and/or the DCI format C) and the DCI format(s) for the uplink (e.g., the DCI format D, and/or the DCI format F). Also, the sixth information may be configured for each of the PDSCH and the PUSCH. Namely, the sixth information may be configured for each of the downlink and the uplink.

Here, a mapping (e.g., a link (e.g., linking, a pairing, a correspondence)) of the scheduling BWP(s) and the scheduled BWP(s) may be many-to-one mapping (e.g., or many-to-many mapping). Namely, one or more scheduling BWPs (e.g., one or more indices of the BWPs (e.g., one or more indices of the DL BWPs)) may be configured for one scheduled BWP (e.g., or one or more scheduled BWPs). Namely, multiple scheduling BWPs (e.g., multiple indices of the one or more scheduling BWPs) may be configured for one scheduled BWP (e.g., or multiple scheduled BWPs). For example, one scheduling BWP among the multiple scheduling BWPs may be used for scheduling of the initial transmission on the PDSCH, and other scheduling BWP among the multiple scheduling BWPs may be used for scheduling of the retransmission on the PDSCH. Also, one scheduling BWP among the multiple scheduling BWPs may be used for scheduling of the initial transmission on the PUSCH, and other scheduling BWP among the multiple scheduling BWPs may be used for scheduling of the retransmission on the PUSCH.

Here, a mapping (e.g., a link (e.g., linking, a pairing, a correspondence)) of the scheduling BWP(s) and the scheduled BWP(s) may be one-to-one mapping (e.g., or one-to-many mapping). Namely, one scheduling BWP (e.g., one index of the BWP (e.g., one index of the DL BWP)) may be configured for one scheduled BWP (e.g., one or more scheduled BWPs). Namely, multiple scheduling BWPs (e.g., multiple indices of the scheduling BWPs) may not be configured for one scheduled BWP (e.g., or multiple scheduled BWPs).

Also, the index of the scheduling BWP may be configured by using the index of the BWP(s). As described above, if the default BWP(s) (e.g., the default DL BWP(s) and/or the default UL BWP(s)) is not configured, the index of the initial active BWP(s) (e.g., the index of the initial active DL BWP(s) and/or the initial active UL BWP(s)) may be "0". Also, if the default BWP(s) (e.g., the default DL BWP(s) and/or the default UL BWP(s)) is configured, the index of the default BWP(s) (e.g., the index of the default DL BWP(s) and/or the default UL BWP(s)) may be "0". Also, the index of the secondary BWP(s) (e.g., the secondary DL BWP(s) and/or the secondary UL BWP(s)) may be corresponding to the index of the BWP(s) (e.g., the index of the BWP(s) (e.g., the DL BWP(s) and/or the UL BWP(s)) configured by the gNB 160). Also, the mapping of the scheduling BWP(s) and the scheduled BWP(s) may depend on the subcarrier spacing. For example, the mapping of the scheduling BWP(s) and the scheduled BWP(s) may be applied for only the same subcarrier spacing. For example, the scheduling BWP(s) with a subcarrier spacing "A" may be mapped to only the scheduled BWP(s) with the subcarrier spacing "A". Also, the multiple scheduling BWPs may be BWPs with the same subcarrier spacing "A".

Here, as one example, the first BWP (e.g., the first DL BWP and/or the first UL BWP, the index of the BWP "0" (e.g., the initial active BWP and/or the default BWP)), the second BWP (e.g., the second DL BWP and/or the second UL BWP, the index of the BWP "1"), the third BWP (e.g., the third DL BWP and/or the third UL BWP, the index of the BWP "2"), and the fourth BWP (e.g., the fourth DL BWP and/or the fourth UL BWP, the index of the BWP "3") may be configured. Namely, as described in FIG. 6, the first BWP (e.g., the first DL BWP and/or the first UL BWP, the index of the DL BWP "0" and/or the index of the UL BWP "0" (e.g., the initial active BWP and/or the default BWP)), the second BWP (e.g., the second DL BWP and/or the second UL BWP, the index of the DL BWP "1" and/or the index of the UL BWP "1"), the third BWP (e.g., the third DL BWP and/or the third UL BWP, the index of the DL BWP "2" and/or the index of the UL BWP "2"), and the fourth BWP (e.g., the fourth DL BWP and/or the fourth UL BWP, the index of the DL BWP "3" and/or the index of the UL BWP "3") may be configured.

And, for the first BWP (e.g., the index of the BWP "0") (e.g., the concerned BWP(s)), the gNB 160 may configure the index of the BWP "0" as the index of the scheduling BWP. Namely, the gNB 160 may configure one index of the BWP as the index of the scheduling BWP. Also, for the second BWP (e.g., the index of the BWP "1") (e.g., the concerned BWP(s)), the gNB 160 may configure the index of the BWP "0" and the index of the BWP "1" as the index of the scheduling BWP. Namely, the gNB 160 may configure more than one indices of the BWPs as the index of the scheduling BWP. Also, for the third BWP (e.g., the index of the BWP "2") (e.g., the concerned BWP(s)), the gNB 160 may configure the index of the BWP "2" and the index of the BWP "1" as the index of the scheduling BWP. Namely, the gNB 160 may configure more than one indices of the BWPs as the index of the scheduling BWP. Also, for the fourth BWP (e.g., the index of the BWP "3") (e.g., the concerned BWP(s)), the gNB 160 may configure the index of the BWP "3" as the index of the scheduling BWP. Namely, the gNB 160 may configure one index of the BWPs as the index of the scheduling BWP. Here, as described above, the initial active BWP(s) and/or the default BWP(s) may be always scheduled by using the DCI format(s) for the downlink the initial active BWP(s) and/or the default BWP(s) (i.e., via its PDCCH).

Namely, the PDSCH in the first BWP (e.g., the index of the BWP "0") may be scheduled by using the DCI format(s) for the downlink in the first BWP (e.g., the index of the BWP "0"). Also, the PDSCH in the second BWP (e.g., the index of the BWP "1") may be scheduled by using the DCI format(s) for the downlink in the first BWP (e.g., the index of the BWP "0") and/or the second BWP (e.g., the index of the BWP "1"). Also, the PDSCH in the third BWP (e.g., the index of the BWP "2") may be scheduled by using the DCI format(s) for the downlink in the first BWP (e.g., the index of the BWP "0") and/or the second BWP (e.g., the index of the BWP "1"). Also, the PDSCH in the fourth BWP (e.g., the index of the BWP "3") may be scheduled by using the DCI format(s) for the downlink in the fourth BWP (e.g., the index of the BWP "3").

Namely, the PDSCH in the first BWP (e.g., the index of the BWP "0" (i.e., "00")) and the PDSCH in the second BWP (e.g., the index of the BWP "1" (i.e., 01)) and the PDSCH in the third BWP (e.g., the index of the BWP "2" (i.e., 10)) may be scheduled by using the DCI format(s) for the downlink in the first BWP. And, in a case that the DCI format(s) for the downlink is received and the BWP indicator field(s) indicates a value of "00", the UE 102 may recognize the PDSCH in the first BWP (e.g., the index of the BWP "0" (i.e., "00")) is scheduled. And, the UE 102 may perform the reception on the PDSCH in the first BWP (e.g., the index of the BWP "0" (i.e., "00")). Also, in a case that the DCI format(s) for the downlink is received and the BWP indicator field(s) indicates a value of "01", the UE 102 may recognize the PDSCH in the second BWP (e.g., the index of the BWP "1" (i.e., "01")) is scheduled. And, the UE 102 may perform the reception on the PDSCH in the second BWP (e.g., the index of the BWP "1" (i.e., "01")). Also, in a case that the DCI format(s) for the downlink is received and the BWP indicator field(s) indicates a value of "10", the UE 102 may recognize the PDSCH in the third BWP (e.g., the index of the BWP "2" (i.e., "10")) is scheduled. And, the UE 102 may perform the reception on the PDSCH in the third BWP (e.g., the index of the BWP "2" (i.e., "10")).

Also, the PDSCH in the second BWP (e.g., the index of the BWP "1" (i.e., 01)) and the PDSCH in the third BWP (e.g., the index of the BWP "2" (i.e., 10)) may be scheduled by using the DCI format(s) for the downlink in the second BWP. And, in a case that the DCI format(s) for the downlink is received and the BWP indicator field(s) indicates a value of "01", the UE 102 may recognize the PDSCH in the second BWP (e.g., the index of the BWP "1" (i.e., "01")) is scheduled. And, the UE 102 may perform the reception on the PDSCH in the second BWP (e.g., the index of the BWP "1" (i.e., "01")). Also, in a case that the DCI format(s) for the downlink is received and the BWP indicator field(s) indicates a value of "10", the UE 102 may recognize the PDSCH in the third BWP (e.g., the index of the BWP "2" (i.e., "10")) is scheduled. And, the UE 102 may perform the reception on the PDSCH in the third BWP (e.g., the index of the BWP "2" (i.e., "10")). Namely, the UE 102 may not receive the DCI format for the downlink including the BWP indicator field(s) set to "00" and/or "11". Namely, based on the information used for configuring the index of the scheduling BWP(s), the UE 102 may determine (e.g., assume) the value(s) (e.g., the value(s) of "01" and "10") of the BWP indicator field(s) (e.g., the value(s) to which the BWP indicator field(s) is set). Also, based on the information used for configuring the index of the scheduling BWP(s), the UE 102 may determine (e.g., assume) the value(s) (e.g., the value(s) of "00" and/or "11") to which the BWP indicator field(s) is not set. Namely, based on the information used for configuring the index of the scheduling BWP(s), the UE 102 may not be expected to receive the value(s) (e.g., the value(s) of "00" and/or "11") to which the BWP indicator field(s) is not set.

Also, the PDSCH in the fourth BWP (e.g., the index of the BWP "3" (i.e., 11)) may be scheduled by using the DCI format(s) for the downlink in the fourth BWP. And, in a case that the DCI format(s) for the downlink is received and the BWP indicator field(s) indicates a value of "11", the UE 102 may recognize the PDSCH in the fourth BWP (e.g., the index of the BWP "3" (i.e., "11")) is scheduled. And, the UE 102 may perform the reception on the PDSCH in the fourth BWP (e.g., the index of the BWP "3" (i.e., "11")). Namely, the UE 102 may not receive the DCI format for the downlink including the BWP indicator field(s) set to "00", "01", and "10". Namely, based on the information used for configuring the index of the scheduling BWP(s), the UE 102 may determine (e.g., assume) the value(s) (e.g., the value(s) of "11") of the BWP indicator field(s) (e.g., the value(s) to which the BWP indicator field(s) is set). Also, based on the information used for configuring the index of the scheduling BWP(s), the UE 102 may determine (e.g., assume) the value(s) (e.g., the value(s) of "00", "01" and/or "10") to which the BWP indicator field(s) is not set. Namely, based on the information used for configuring the index of the scheduling BWP(s), the UE 102 may not be expected to receive the value(s) (e.g., the value(s) of "00", "01" and/or "10") to which the BWP indicator field(s) is not set.

Also, for example, the PUSCH in the first BWP (e.g., the index of the BWP "0") may be scheduled by using the DCI format(s) for the uplink in the first BWP (e.g., the index of the BWP "0"). Also, the PUSCH in the second BWP (e.g., the index of the BWP "1") may be scheduled by using the DCI format(s) for the uplink in the first BWP (e.g., the index of the BWP "0") and/or the second BWP (e.g., the index of the BWP "1"). Also, the PUSCH in the third BWP (e.g., the index of the BWP "2") may be scheduled by using the DCI format(s) for the uplink in the first BWP (e.g., the index of the BWP "0") and/or the second BWP (e.g., the index of the BWP "1"). Also, the PDSCH in the fourth BWP (e.g., the index of the BWP "3") may be scheduled by using the DCI format(s) for the uplink in the fourth BWP (e.g., the index of the BWP "3").

Namely, the PUSCH in the first BWP (e.g., the index of the BWP "0" (i.e., "00")) and the PUSCH in the second BWP (e.g., the index of the BWP "1" (i.e., 01)) and the PUSCH in the third BWP (e.g., the index of the BWP "2" (i.e., 10)) may be scheduled by using the DCI format(s) for the uplink in the first BWP. And, in a case that the DCI format(s) for the uplink is received and the BWP indicator field(s) indicates a value of "00", the UE 102 may recognize the PUSCH in the first BWP (e.g., the index of the BWP "0" (i.e., "00")) is scheduled. And, the UE 102 may perform the transmission on the PUSCH in the first BWP (e.g., the index of the BWP "0" (i.e., "00")). Also, in a case that the DCI format(s) for the uplink is received and the BWP indicator field(s) indicates a value of "01", the UE 102 may recognize the PUSCH in the second BWP (e.g., the index of the BWP "1" (i.e., "01")) is scheduled. And, the UE 102 may perform the transmission on the PUSCH in the second BWP (e.g., the index of the BWP "1" (i.e., "01")). Also, in a case that the DCI format(s) for the uplink is received and the BWP indicator field(s) indicates a value of "10", the UE 102 may recognize the PUSCH in the third BWP (e.g., the index of the BWP "2" (i.e., "10")) is scheduled. And, the UE 102 may perform the transmission on the PDSCH in the third BWP (e.g., the index of the BWP "2" (i.e., "10")).

Also, the PUSCH in the second BWP (e.g., the index of the BWP "1" (i.e., 01)) and the PUSCH in the third BWP (e.g., the index of the BWP "2" (i.e., 10)) may be scheduled by using the DCI format(s) for the uplink in the second BWP. And, in a case that the DCI format(s) for the uplink is received and the BWP indicator field(s) indicates a value of "01", the UE 102 may recognize the PUSCH in the second BWP (e.g., the index of the BWP "1" (i.e., "01")) is scheduled. And, the UE 102 may perform the transmission on the PUSCH in the second BWP (e.g., the index of the BWP "1" (i.e., "01")). Also, in a case that the DCI format(s) for the uplink is received and the BWP indicator field(s) indicates a value of "10", the UE 102 may recognize the PUSCH in the third BWP (e.g., the index of the BWP "2" (i.e., "10")) is scheduled. And, the UE 102 may perform the transmission on the PUSCH in the third BWP (e.g., the index of the BWP "2" (i.e., "10")). Namely, the UE 102 may not receive the DCI format(s) for the uplink including the BWP indicator field(s) set to "00" and/or "11". Namely, based on the information used for configuring the index of the scheduling BWP(s), the UE 102 may determine (e.g., assume) the value(s) (e.g., the value(s) of "01" and "10") of the BWP indicator field(s) (e.g., the value(s) to which the BWP indicator field(s) is set). Also, based on the information used for configuring the index of the scheduling BWP(s), the UE 102 may determine (e.g., assume) the value(s) (e.g., the value(s) of "00" and/or "11") to which the BWP indicator field(s) is not set. Namely, based on the information used for configuring the index of the scheduling BWP(s), the UE 102 may not be expected to receive the value(s) (e.g., the value(s) of "00" and/or "11") to which the BWP indicator field(s) is not set.

Also, the PUSCH in the fourth BWP (e.g., the index of the BWP "3" (i.e., 11)) may be scheduled by using the DCI format(s) for the uplink in the fourth BWP. And, in a case that the DCI format(s) for the uplink is received and the BWP indicator field(s) indicates a value of "11", the UE 102 may recognize the PUSCH in the fourth BWP (e.g., the index of the BWP "3" (i.e., "11")) is scheduled. And, the UE 102 may perform the transmission on the PUSCH in the fourth BWP (e.g., the index of the BWP "3" (i.e., "11")). Namely, the UE 102 may not receive the DCI format(s) for the uplink including the BWP indicator field(s) set to "00", "01", and "10". Namely, based on the information used for configuring the index of the scheduling BWP(s), the UE 102 may determine (e.g., assume) the value(s) (e.g., the value(s) of "11") of the BWP indicator field(s) (e.g., the value(s) to which the BWP indicator field(s) is set). Also, based on the information used for configuring the index of the scheduling BWP(s), the UE 102 may determine (e.g., assume) the value(s) (e.g., the value(s) of "00", "01" and/or "10") to which the BWP indicator field(s) is not set. Namely, based on the information used for configuring the index of the scheduling BWP(s), the UE 102 may not be expected to receive the value(s) (e.g., the value(s) of "00", "01" and/or "10") to which the BWP indicator field(s) is not set.

Here, the value(s) of the BWP indicator field(s) may be determined based on the number of the scheduling BWP(s) (e.g., the number of a candidate(s) of the scheduling BWP(s), the number of the scheduling BWP(s) that is possible to be used). For example, the UE 102 may determine the number of the scheduled BWP(s) based on the sixth information. Also, the gNB 160 may transmit, by using the PBCH (e.g., the MIB), the PDSCH (e.g., the SIB type 2), and/or the RRC message (e.g., the dedicated RRC message), information (e.g., seventh information) used for configuring the number of the scheduling BWP(s).

Also, the gNB 160 may transmit, by using the PBCH (e.g., the MIB), the PDSCH (e.g., the SIB type 2), and/or the RRC message (e.g., the dedicated RRC message), information (e.g., eighth information) used for configuring a mapping (e.g., a link (e.g., a linking, a pairing, and/or a correspondence)) between the value(s) of the BWP indicator field(s) and the index of the scheduling BWP(s) (e.g., the index of the DL BWP(s) and/or the index of the UL BWP(s)). Here, the mapping between the value(s) of the BWP indicator field(s) and the index of the scheduled BWP(s) may be specified, in advance, by the specification, and known information between the gNB 160 and the UE 102.

Figure 7:
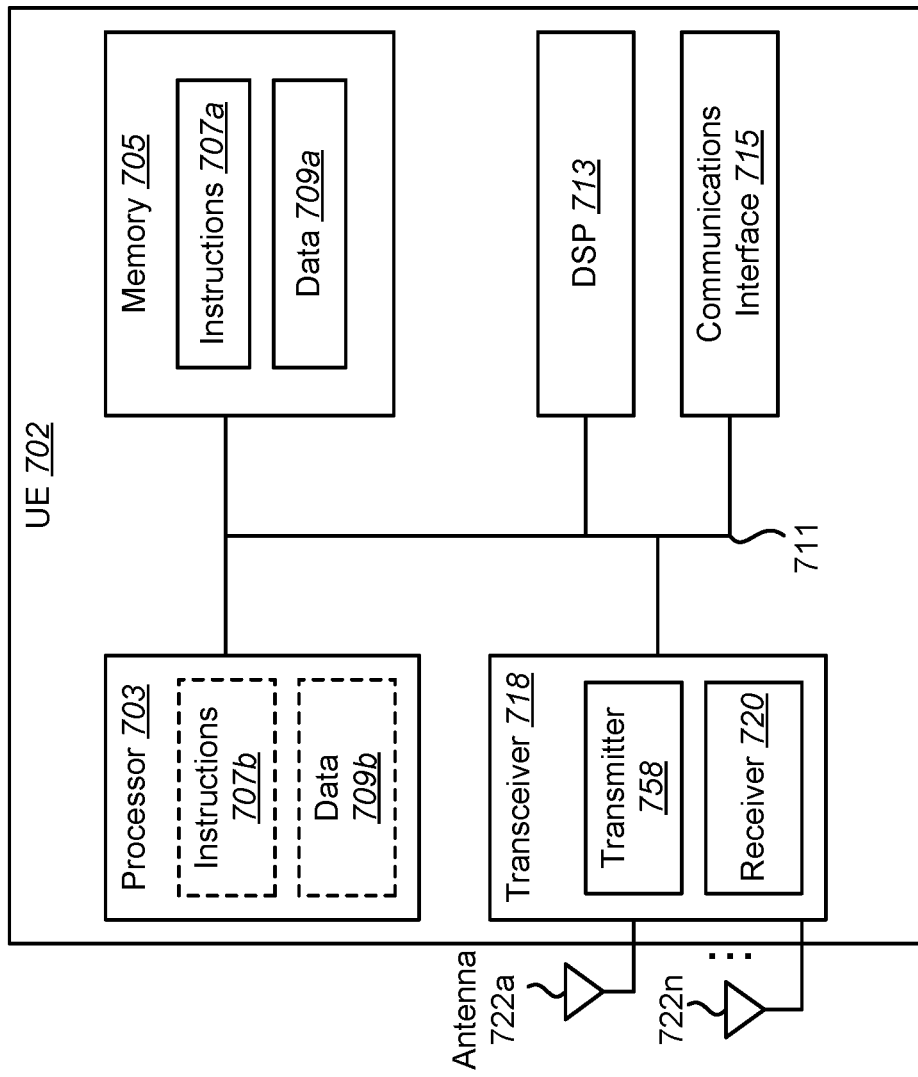
FIG. 7 illustrates various components that may be utilized in a UE.

FIG. 7 illustrates various components that may be utilized in a UE 702. The UE 702 described in connection with FIG. 7 may be implemented in accordance with the UE 102 described in connection with FIG. 1. The UE 702 includes a processor 703 that controls operation of the UE 702. The processor 703 may also be referred to as a central processing unit (CPU). Memory 705, which may include read-only memory (ROM), random access memory (RAM), a combination of the two or any type of device that may store information, provides instructions 707a and data 709a to the processor 703. A portion of the memory 705 may also include non-volatile random access memory (NVRAM). Instructions 707b and data 709b may also reside in the processor 703. Instructions 707b and/or data 709b loaded into the processor 703 may also include instructions 707a and/or data 709a from memory 705 that were loaded for execution or processing by the processor 703. The instructions 707b may be executed by the processor 703 to implement the methods described above.

The UE 702 may also include a housing that contains one or more transmitters 758 and one or more receivers 720 to allow transmission and reception of data. The transmitter(s) 758 and receiver(s) 720 may be combined into one or more transceivers 718. One or more antennas 722a-n are attached to the housing and electrically coupled to the transceiver 718.

The various components of the UE 702 are coupled together by a bus system 711, which may include a power bus, a control signal bus and a status signal bus, in addition to a data bus. However, for the sake of clarity, the various buses are illustrated in FIG. 7 as the bus system 711. The UE 702 may also include a digital signal processor (DSP) 713 for use in processing signals. The UE 702 may also include a communications interface 715 that provides user access to the functions of the UE 702. The UE 702 illustrated in FIG. 7 is a functional block diagram rather than a listing of specific components.

Figure 8:
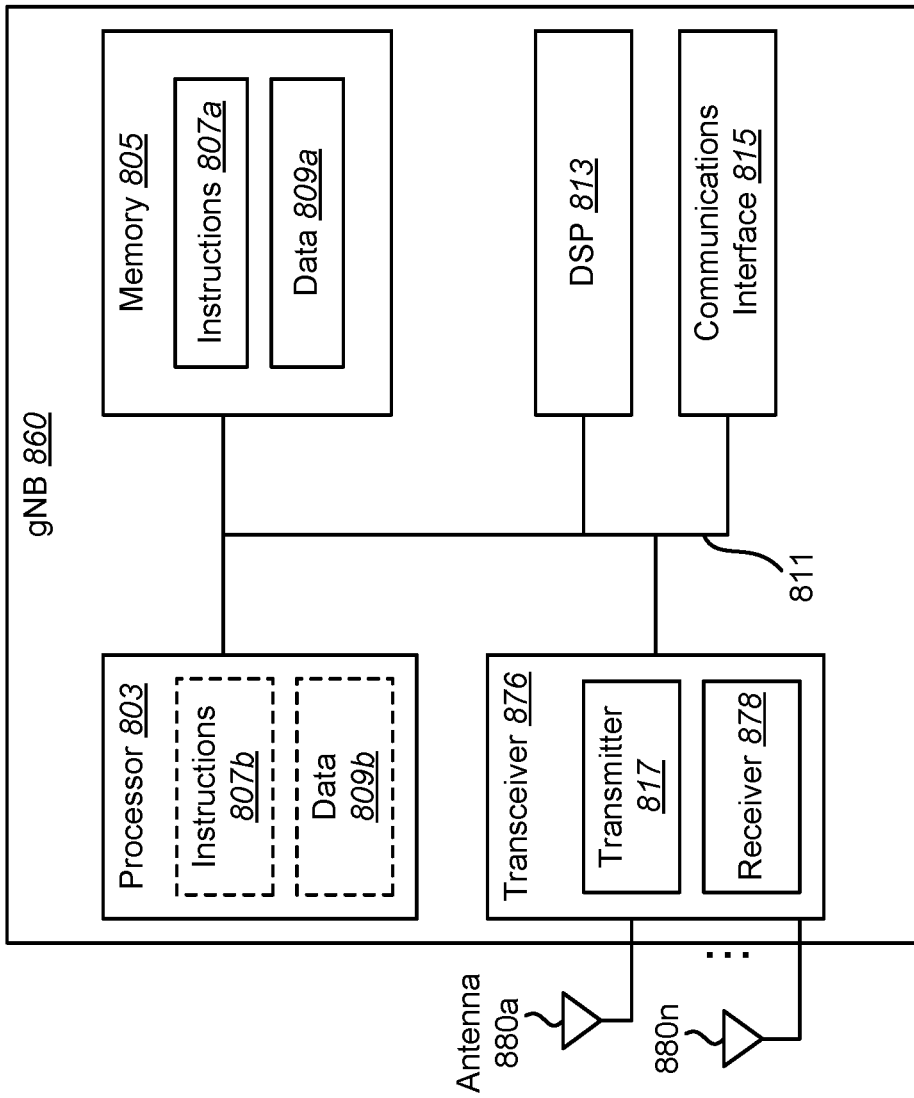
FIG. 8 illustrates various components that may be utilized in a gNB.

FIG. 8 illustrates various components that may be utilized in a gNB 860.

The gNB 860 described in connection with FIG. 8 may be implemented in accordance with the gNB 160 described in connection with FIG. 1. The gNB 860 includes a processor 803 that controls operation of the gNB 860. The processor 803 may also be referred to as a central processing unit (CPU). Memory 805, which may include read-only memory (ROM), random access memory (RAM), a combination of the two or any type of device that may store information, provides instructions 807a and data 809a to the processor 803. A portion of the memory 805 may also include non-volatile random access memory (NVRAM). Instructions 807b and data 809b may also reside in the processor 803. Instructions 807b and/or data 809b loaded into the processor 803 may also include instructions 807a and/or data 809a from memory 805 that were loaded for execution or processing by the processor 803. The instructions 807b may be executed by the processor 803 to implement the methods described above.

The gNB 860 may also include a housing that contains one or more transmitters 817 and one or more receivers 878 to allow transmission and reception of data. The transmitter(s) 817 and receiver(s) 878 may be combined into one or more transceivers 876. One or more antennas 880a-n are attached to the housing and electrically coupled to the transceiver 876.

The various components of the gNB 860 are coupled together by a bus system 811, which may include a power bus, a control signal bus and a status signal bus, in addition to a data bus. However, for the sake of clarity, the various buses are illustrated in FIG. 8 as the bus system 811. The gNB 860 may also include a digital signal processor (DSP) 813 for use in processing signals. The gNB 860 may also include a communications interface 815 that provides user access to the functions of the gNB 860. The gNB 860 illustrated in FIG. 8 is a functional block diagram rather than a listing of specific components.

Figure 9:
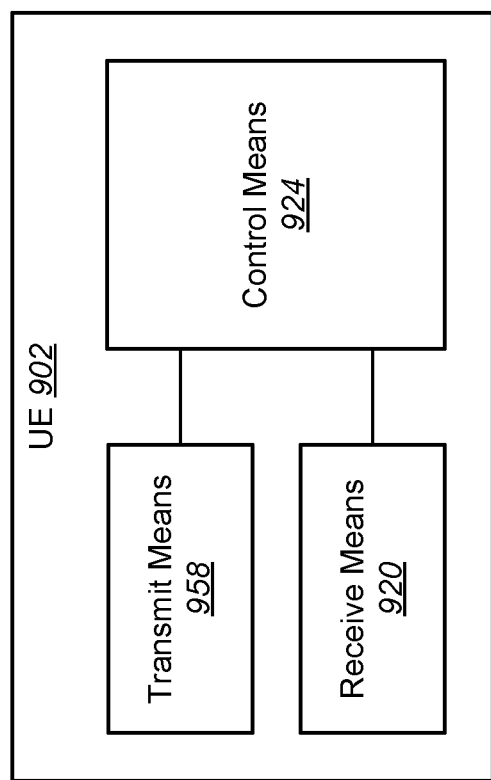
FIG. 9 is a block diagram illustrating one implementation of a UE in which systems and methods for downlink and/or uplink (re)transmissions may be implemented.

FIG. 9 is a block diagram illustrating one implementation of a UE 902 in which systems and methods for downlink and/or uplink (re)transmissions may be implemented. The UE 902 includes transmit means 958, receive means 920 and control means 924. The transmit means 958, receive means 920 and control means 924 may be configured to perform one or more of the functions described in connection with FIG. 1 above. FIG. 7 above illustrates one example of a concrete apparatus structure of FIG. 9. Other various structures may be implemented to realize one or more of the functions of FIG. 1. For example, a DSP may be realized by software.

Figure 10:
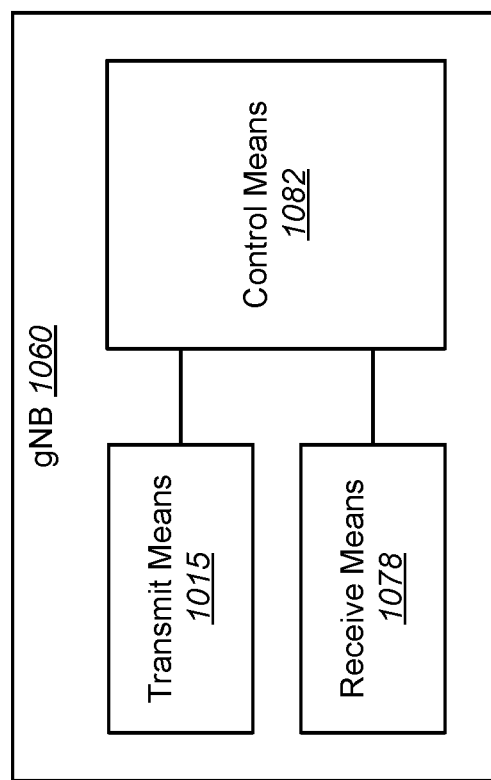
FIG. 10 is a block diagram illustrating one implementation of a gNB in which systems and methods for downlink and/or uplink (re)transmissions may be implemented.

FIG. 10 is a block diagram illustrating one implementation of a gNB 1060 in which systems and methods for downlink and/or uplink (re)transmissions may be implemented. The gNB 1060 includes transmit means 1017, receive means 1078 and control means 1082. The transmit means 1017, receive means 1078 and control means 1082 may be configured to perform one or more of the functions described in connection with FIG. 1 above. FIG. 8 above illustrates one example of a concrete apparatus structure of FIG. 10. Other various structures may be implemented to realize one or more of the functions of FIG. 1. For example, a DSP may be realized by software.

Figure 11:
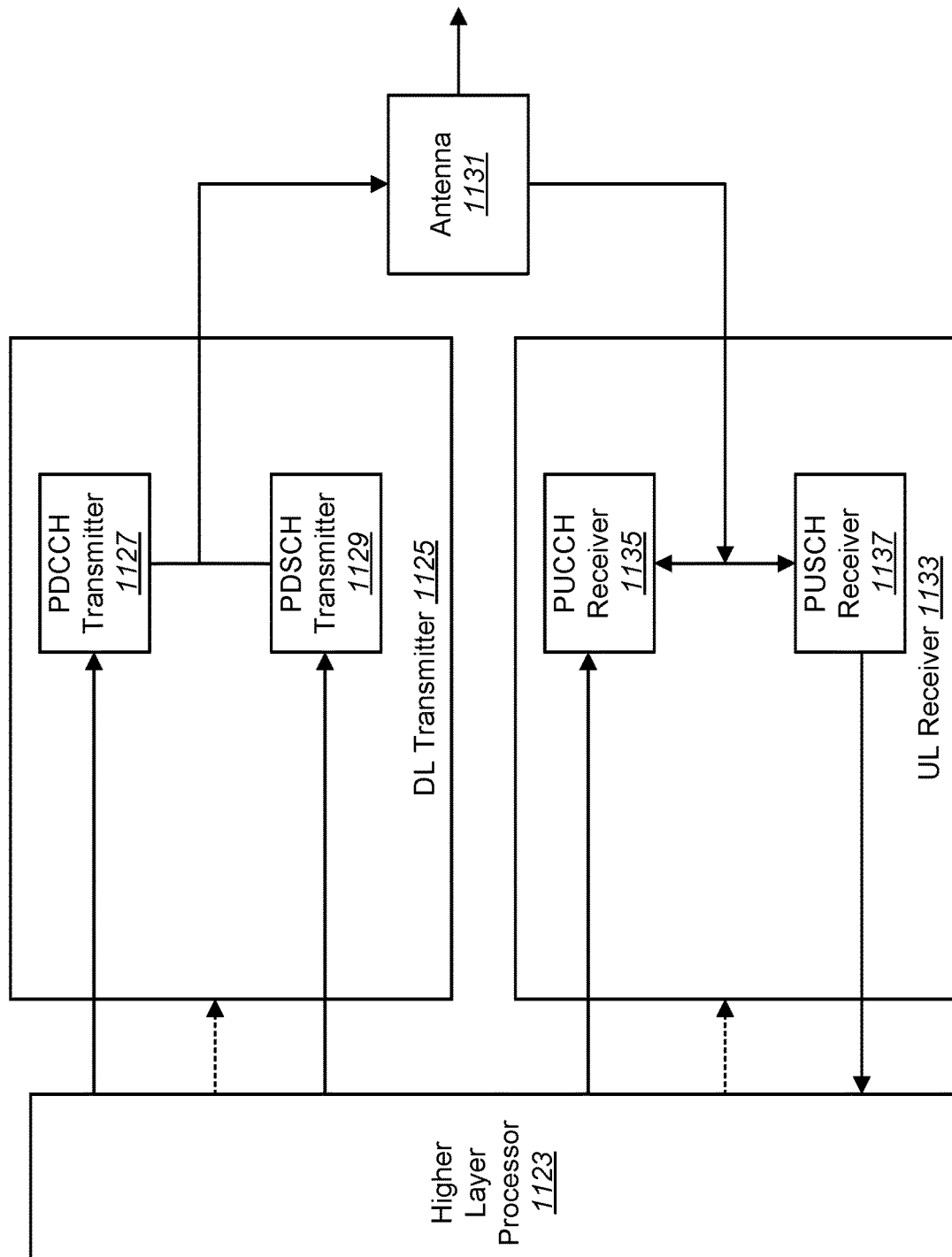
FIG. 11 is a block diagram illustrating one implementation of a gNB.

FIG. 11 is a block diagram illustrating one implementation of an gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
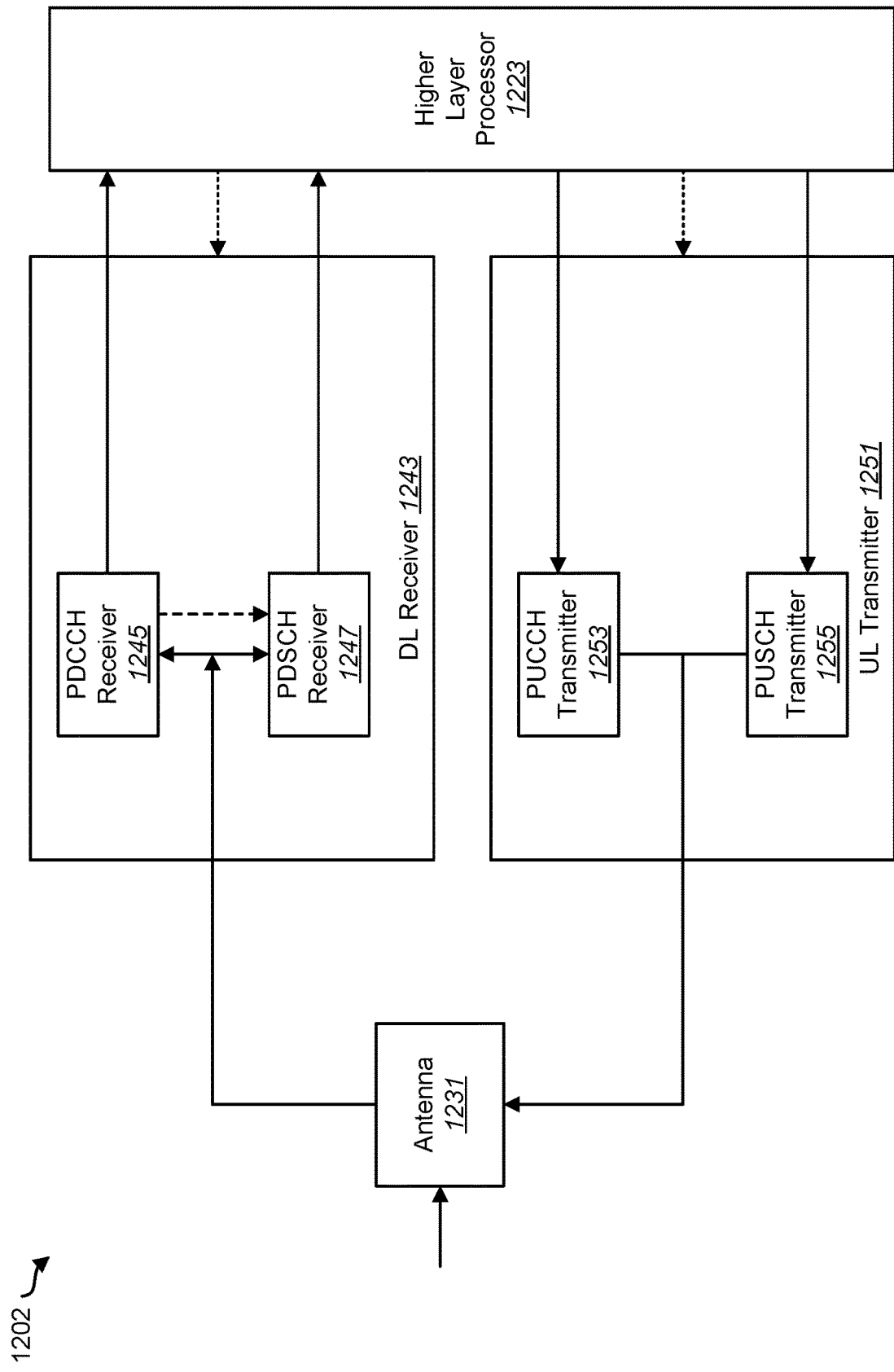
FIG. 12 is a block diagram illustrating one implementation of a UE.

FIG. 12 is a block diagram illustrating one implementation of a UE 1202.

The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

Figure 13:
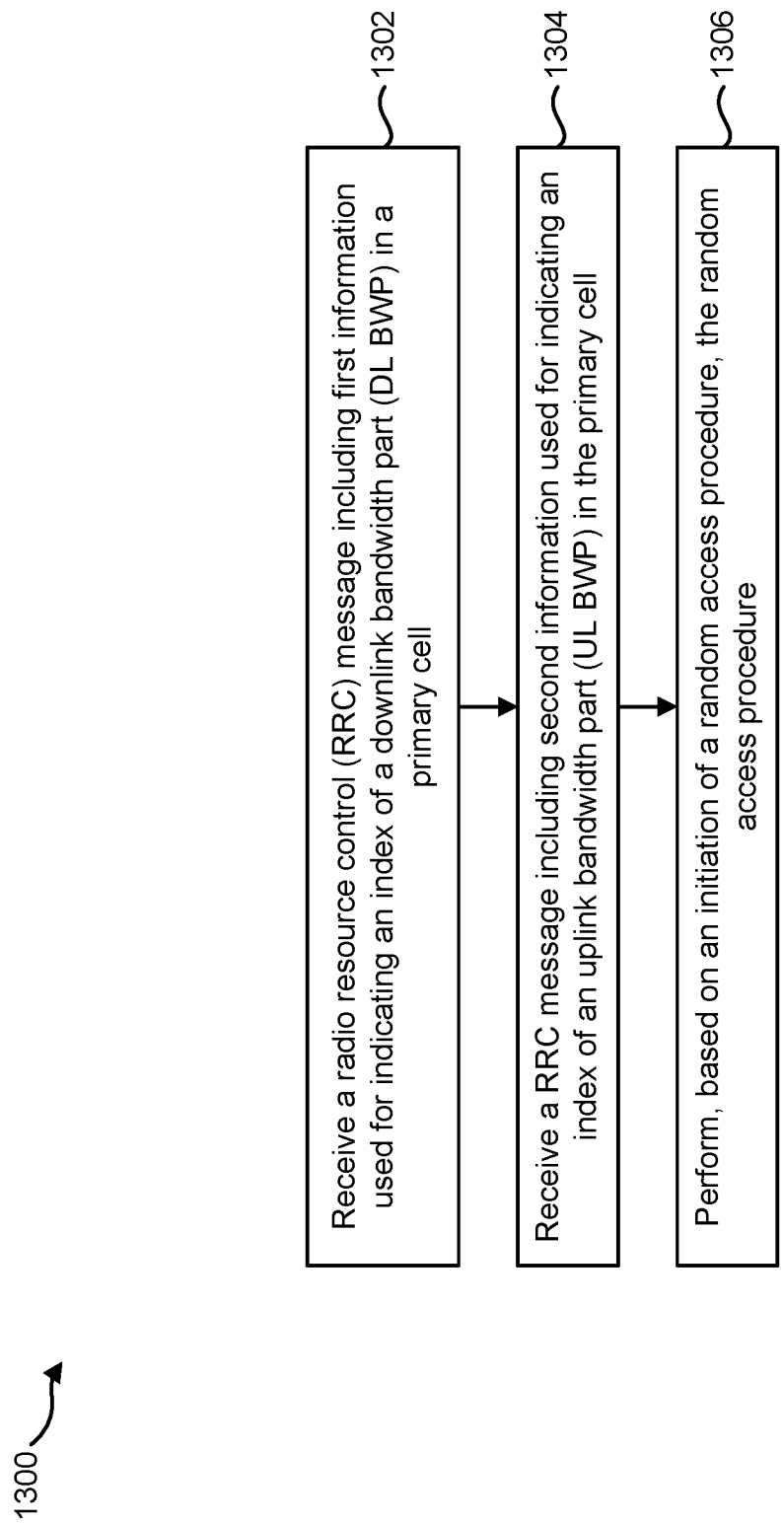
FIG. 13 is a flow diagram illustrating a communication method of a user equipment.

FIG. 13 is a flow diagram illustrating a communication method 1300 of a user equipment 102. The communication method 1300 includes receiving 1302 a radio resource control (RRC) message including first information used for indicating an index of a downlink bandwidth part (DL BWP) in a primary cell. The communication method 1300 also includes receiving 1304 a RRC message comprising second information used for indicating an index of an uplink bandwidth part (UL BWP) in the primary cell. The communication method 1300 also includes performing 1306, based on an initiation of a random access procedure, the random access procedure. In a case that physical random access channel (PRACH) resources are not configured for an active UL BWP in the primary cell, the random access procedure may be performed on a DL BWP in the primary cell and an UL BWP in the primary cell. An index of the DL BWP may be defined as "0", and an index of the UL BWP may be defined as "0". In a case that PRACH resources are configured for an active UL BWP in the primary cell, the random access procedure may be performed on a DL BWP in the primary cell and the active UL BWP in the primary cell. The DL BWP may be linked with the active UL BWP based on the index of the DL BWP indicated by using the first information and the index of the UL BWP indicated by using the second information.

The communication method 1300 may also further include receiving system information comprising third information used for indicating a bandwidth of the DL BWP with the index "0" and a subcarrier spacing of the DL BWP with the index "0". The communication method 1300 may also further include receiving system information comprising fourth information used for indicating a bandwidth of the UL BWP with the index "0" and a subcarrier spacing of the UL BWP with the index "0". The DL BWP with the index "0" may be activated and the UL BWP with the index "0" may be activated.

Figure 14:
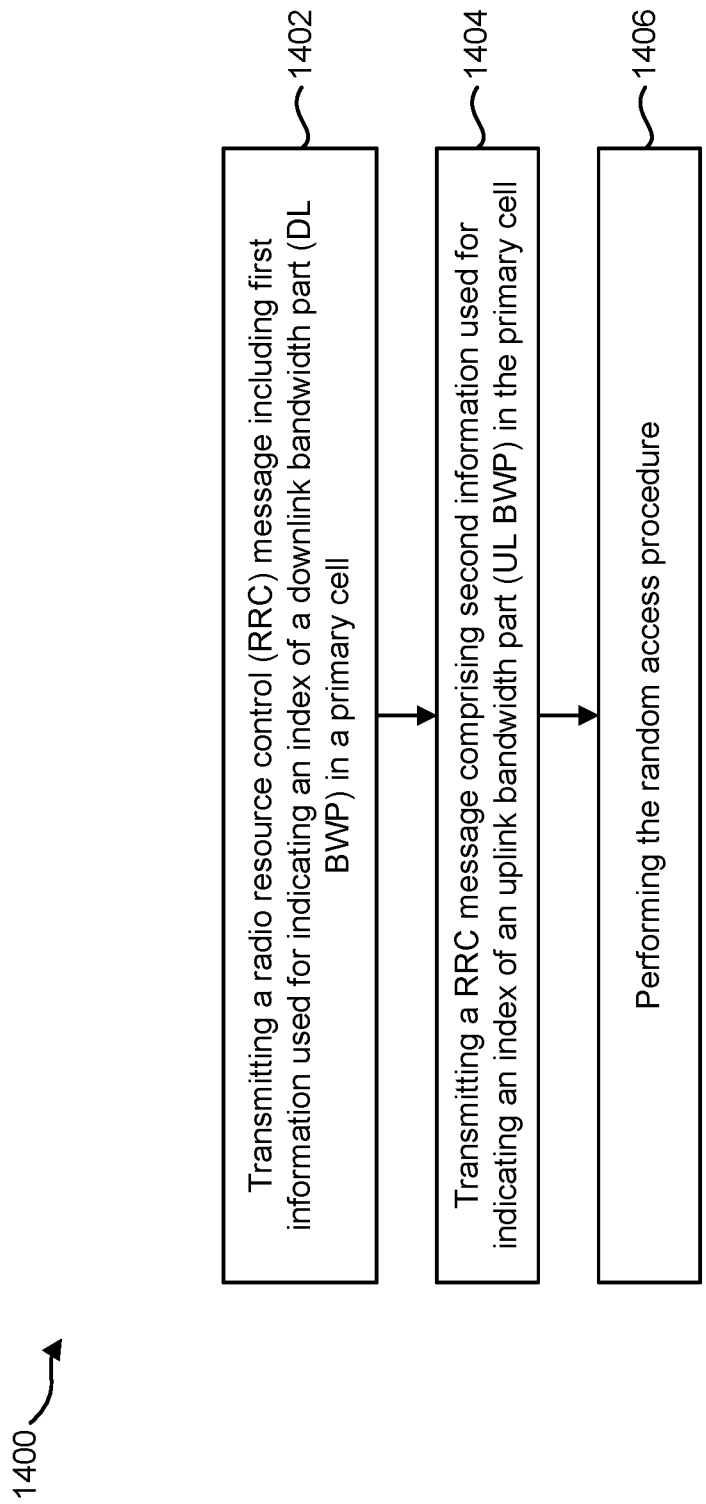
FIG. 14 is a flow diagram illustrating a communication method of a base station apparatus.

FIG. 14 is a flow diagram illustrating a communication method 1400 of a base station apparatus 160. The communication method 1400 includes transmitting 1402 a radio resource control (RRC) message including first information used for indicating an index of a downlink bandwidth part (DL BWP) in a primary cell. The communication method 1400 also includes transmitting 1404 a RRC message comprising second information used for indicating an index of an uplink bandwidth part (UL BWP) in the primary cell. The communication method 1400 also includes performing 1406 the random access procedure. In a case that physical random access channel (PRACH) resources is not configured for an active UL BWP in the primary cell, the random access procedure may be performed on a DL BWP in the primary cell and an UL BWP in the primary cell. An index of the DL BWP may be defined as "0", and an index of the UL BWP may be defined as "0". In a case that PRACH resources are configured for an active UL BWP in the primary cell, the random access procedure may be performed on a DL BWP in the primary cell and the active UL BWP in the primary cell. The DL BWP may be linked with the active UL BWP based on the index of the DL BWP indicated by using the first information and the indicated index of the UL BWP indicated by using the second information.

The communication method 1400 may also include transmitting system information comprising third information used for indicating a bandwidth of the DL BWP with the index "0" and a subcarrier spacing of the DL BWP with the index "0". The communication method 1400 may also include transmitting system information comprising fourth information used for indicating a bandwidth of the UL BWP with the index "0" and a subcarrier spacing of the UL BWP with the index "0".

The DL BWP with the index "0" may be activated, and the UL BWP with the index "0" may be activated As described above, some methods for the DL and/or UL transmissions (e.g., the PDSCH transmission and/or the PUSCH transmission) may be applied (e.g., specified). Here, the combination of one or more of the methods described above may be applied for the DL and/or UL transmission (e.g., the PDSCH transmission and/or the PUSCH transmission). The combination of the one or more of the methods described above may not be precluded in the described systems and methods.

It should be noted that names of physical channels described herein are examples. The other names such as "NRPDCCH, NRPDSCH, NRPUCCH and NRPUSCH," "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD and the like), a magnetic storage medium (for example, a magnetic tape, a flexible disk and the like) and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment comprising:
receiving circuitry configured to receive a radio resource control (RRC) message including first information used for indicating an index of a downlink bandwidth part (DL BWP) in a primary cell,
the receiving circuitry configured to receive another RRC message comprising second information used for indicating an index of an uplink bandwidth part (UL BWP) in the primary cell, and
transmitting circuitry configured to perform, based on an initiation of a random access procedure, the random access procedure, wherein:
in a case that physical random access channel (PRACH) resources are not configured for an active UL BWP in the primary cell, the random access procedure is performed on a DL BWP being defined as index "0" in the primary cell and a UL BWP in the primary cell, and the random access procedure is not performed on the UL BWP unless the UL BWP is defined as index "0" and has a configured PRACH resource, and
in a case that PRACH resources are configured for an active UL BWP in the primary cell, the random access procedure is performed on a DL BWP in the primary cell and the active UL BWP in the primary cell, the DL BWP being linked with the active UL BWP based on the index of the DL BWP indicated by using the first information and the index of the UL BWP indicated by using the second information.

2. The user equipment according to claim 1, wherein the receiving circuitry is configured to receive system information comprising third information used for indicating a bandwidth of the DL BWP with the index "0" and a subcarrier spacing of the DL BWP with the index "0", and the receiving circuitry is configured to receive system information comprising fourth information used for indicating a bandwidth of the UL BWP with the index "0" and a subcarrier spacing of the UL BWP with the index "0".

3. The user equipment according to claim 1, wherein the DL BWP with the index "0" is activated and the UL BWP with the index "0" is activated.

4. A base station apparatus comprising:

transmitting circuitry configured to transmit a radio resource control (RRC) message including first information used for indicating an index of a downlink bandwidth part (DL BWP) in a primary cell, the transmitting circuitry configured to transmit another RRC message comprising second information used for indicating an index of an uplink bandwidth part (UL BWP) in the primary cell, and receiving circuitry configured to perform the random access procedure, wherein in a case that physical random access channel (PRACH) resources are not configured for an active UL BWP in the primary cell, the random access procedure is performed on a DL BWP being defined as index "0" in the primary cell and a UL BWP in the primary cell, and the random access procedure is not performed on the UL BWP unless the UL BWP is defined as index "0" and has a configured PRACH resource, and in a case that PRACH resources are configured for an active UL BWP in the primary cell, the random access procedure is performed on a DL BWP in the primary cell and the active UL BWP in the primary cell, the DL BWP being linked with the active UL BWP based on the index of the DL BWP indicated by using the first information and the index of the UL BWP indicated by using the second information.

5. The base station apparatus according to claim 4, wherein the transmitting circuitry is configured to transmit system information comprising third information used for indicating a bandwidth of the DL BWP with the index "0" and a subcarrier spacing of the DL BWP with the index "0", and the transmitting circuitry is configured to transmit system information comprising fourth information used for indicating a bandwidth of the UL BWP with the index "0" and a subcarrier spacing of the UL BWP with the index "0".

6. The base station apparatus according to claim 4, wherein the DL BWP with the index "0" is activated and the UL BWP with the index "0" is activated.

7. A communication method of a user equipment comprising:

receiving a radio resource control (RRC) message including first information used for indicating an index of a downlink bandwidth part (DL BWP) in a primary cell, receiving another RRC message comprising second information used for indicating an index of an uplink bandwidth part (UL BWP) in the primary cell, and performing, based on an initiation of a random access procedure, the random access procedure, wherein in a case that physical random access channel (PRACH) resources are not configured for an active UL BWP in the primary cell, the random access procedure is performed on a DL BWP being defined as index "0" in the primary cell and a UL BWP in the primary cell, and the random access procedure is not performed on the UL BWP unless the UL BWP is defined as index "0" and has a configured PRACH resource, and in a case that PRACH resources are configured for an active UL BWP in the primary cell, the random access procedure is performed on a DL BWP in the primary cell and the active UL BWP in the primary cell, the DL BWP being linked with the active UL BWP based on the index of the DL BWP indicated by using the first information and the index of the UL BWP indicated by using the second information.

8. The communication method according to claim 7, further comprising:

receiving system information comprising third information used for indicating a bandwidth of the DL BWP with the index "0" and a subcarrier spacing of the DL BWP with the index "0", and receiving system information comprising fourth information used for indicating a bandwidth of the UL BWP with the index "0" and a subcarrier spacing of the UL BWP with the index "0".

9. The communication method according to claim 7, wherein the DL BWP with the index "0" is activated and the UL BWP with the index "0" is activated.

10. A communication method of a base station apparatus comprising:

transmitting a radio resource control (RRC) message including first information used for indicating an index of a downlink bandwidth part (DL BWP) in a primary cell, transmitting another RRC message comprising second information used for indicating an index of an uplink bandwidth part (UL BWP) in the primary cell, and performing the random access procedure, wherein in a case that physical random access channel (PRACH) resources are not configured for an active UL BWP in the primary cell, the random access procedure is performed on a DL BWP being defined as index "0" in the primary cell and a UL BWP in the primary cell, and the random access procedure is not performed on the UL BWP unless the UL BWP is defined as index "0" and has a configured PRACH resource, and in a case that PRACH resources are configured for an active UL BWP in the primary cell, the random access procedure is performed on a DL BWP in the primary cell and the active UL BWP in the primary cell, the DL BWP being linked with the active UL BWP based on the index of the DL BWP indicated by using the first information and the indicated index of the UL BWP indicated by using the second information.

11. The communication method according to claim 10, further comprising:

transmitting system information comprising third information used for indicating a bandwidth of the DL BWP with the index "0" and a subcarrier spacing of the DL BWP with the index "0", and transmitting system information comprising fourth information used for indicating a bandwidth of the UL BWP with the index "0" and a subcarrier spacing of the UL BWP with the index "0".

12. The communication method according to claim 10, wherein the DL BWP with the index "0" is activated and the UL BWP with the index "0" is activated.

* * * * *